US009697292B2

(12) United States Patent
Seo et al.

(10) Patent No.: US 9,697,292 B2
(45) Date of Patent: Jul. 4, 2017

(54) CONTENT MANAGEMENT DEVICE AND CONTENT MANAGEMENT METHOD

(71) Applicant: KOREA INSTITUTE OF SCIENCE AND TECHNOLOGY, Seoul (KR)

(72) Inventors: Daeil Seo, Seoul (KR); Byounghyun Yoo, Seoul (KR); Heedong Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 299 days.

(21) Appl. No.: 14/617,171

(22) Filed: Feb. 9, 2015

(65) Prior Publication Data

US 2016/0026722 A1    Jan. 28, 2016

(30) Foreign Application Priority Data

Jul. 22, 2014   (KR) .......................... 10-2014-0092638

(51) Int. Cl.
*G06F 17/30*    (2006.01)

(52) U.S. Cl.
CPC ............................... *G06F 17/3087* (2013.01)

(58) Field of Classification Search
CPC ............... G06F 17/30; G06F 17/30233; G06F 17/30371; G06F 17/3087; G06F 17/30312; G06F 17/30159; G06F 17/30303
USPC .................................................. 707/600–899
See application file for complete search history.

(56) References Cited

U.S. PATENT DOCUMENTS

2009/0198767 A1\* 8/2009 Jakobson ........... G01C 21/3679
  709/203
2011/0047509 A1\* 2/2011 Arrasvuori ......... G01C 21/3673
  715/815

FOREIGN PATENT DOCUMENTS

| KR | 10-1134883 B1 | 4/2012 |
| KR | 10-2012-0087268 A | 8/2012 |
| KR | 10-2013-0049257 A | 5/2013 |
| KR | 10-2014-0062683 A | 5/2014 |

OTHER PUBLICATIONS

Y-J Park, et al., "A Development of GVP for Hierarchical POI Information Visualization," Korea Computer Congress, vol. 34, No. 1(B), 2007, pp. 390-395 (1 page in English, 6 pages in Korean).
D. Seo, et al., "Level-of-Detail based Adaptive Mobile Storytelling Tour Guide," Korea Computer Congress, 2014, pp. 1346-1348 (1 page in English, 3 pages in Korean).
(Continued)

*Primary Examiner* — Isaac M Woo
(74) *Attorney, Agent, or Firm* — NSIP Law

(57) ABSTRACT

Disclosed is a content management method, which includes obtaining data for a content including a plurality of point-of-interest (POI) and a plurality of POI documents associated with each of the plurality of POIs, obtaining at least one level-of-detail (LOD) information which allows the content to be displayed according to an interest of the user, and determining a display format for the content based on the LOD information. Here, the LOD information may include information for the interest level of the user with regard to the content, and the interest level may be independent from a scale level of a map at which the content is displayed.

20 Claims, 25 Drawing Sheets

(56) References Cited

OTHER PUBLICATIONS

Hadlak, S., et al., "Visualization of attributed hierarchical structures in a spatiotemporal context", International Journal of Geographical Information Science, vol. 24, No. 10, Oct. 2010, pp. 1497-1513.

Gomi, Ai, et al., "A Personal Photograph Browser for Life Log Analysis based on Location, Time, and Person", Proceedings from the ACM Symposium on Applied Computing (SAC '11), held at Taichung, Taiwan, Mar. 21-25, 2011, pp. 1245-1252.

Teraoka, Teruhiko, "Organization and exploration of heterogeneous personal data collected in daily life", Human-centric Computing and Information Sciences, vol. 2, No. 1, 2012, pp. 1-15.

Kim, Pil Ho, et al., "The Open Platform for Personal Lifelogging: The eLifeLong Architecture", Proceedings from the Conference on Human Factors in Computing Systems, Extended Abstracts, held at Paris, France, Apr. 27-May 2, 2013, pp. 1677-1682.

Yoo, B., et al., "Visualization and level-of-detail of metadata for interactive exploration of Sensor Web", International Journal of Digital Earth, Sep. 2013, pp. 1-25.

* cited by examiner

FIG. 6

POIs
id : "http://example.com/europetour"
displayName : "Europe Tour"
pois : ["http://example.com/poi/BuckinghamPalace",
"http://example.com/poi/BigBen",
"http://example.com/poi/EdinburghCastle",
"http://example.com/poi/Pantheon",
"http://example.com/poi/VecchioBridge",]
order : true
— 610

POI
id : "http://example.com/poi/BuckinghamPalace"
displayName : "BuckinghamPalace"
geometry : { "type": "Point", "coordinates":[-0.14189, 51.501364]},
lod : ["geographic/country/uk",
"geographic/city/london",
"timporal/week/1",
"timporal/day/1"]
description : ["http://example.com/poi/BuckinghamPalace#title",
"http://example.com/poi/BuckinghamPalace#text",
"http://example.com/poi/BuckinghamPalace#media"]
content : null
— 620

POI
id : "http://example.com/poi/BigBen"
displayName : "BigBen"
geometry : { "type": "Point", "coordinates":[-0.12465, 51.50076]},
lod : ["geographic/country/uk",
"geographic/city/london",
"timporal/week/1",
"timporal/day/1"]
description : ["http://example.com/poi/BigBen#title",
"http://example.com/poi/BigBen#text",
"http://example.com/poi/BigBen#media"]
content : null
— 630

CONTENT MANAGEMENT DEVICE AND CONTENT MANAGEMENT METHOD

CROSS-REFERENCE TO RELATED APPLICATION

This application claims priority to Korean Patent Application No. 10-2014-0092638, filed on Jul. 22, 2014, and all the benefits accruing therefrom under 35 U.S.C. §119, the contents of which in its entirety are herein incorporated by reference.

BACKGROUND

1. Field

The present disclosure relates to a content management field, and more particularly, to management of a point-of-interest (POI) content including POI information.

DESCRIPTION ABOUT NATIONAL RESEARCH AND DEVELOPMENT SUPPORT

This study was supported by the Content industrial technology support project (TopCloud-Intelligent Social Tour Cloud Technology Development, project No. R2012030062) of Korea Creative Content Agency under Ministry of Culture, Sports and Tourists, Republic of Korea.

2. Description of the Related Art

Along with recent increase of POI contents, more diverse applications (for example, map applications or navigation applications) utilize such contents.

However, existing applications should configure POI contents in a POI format suitable for each application in order to display the POI content on a map. Therefore, if existing applications are used, in order to utilize POI content provided by another application, POI contents should be reconfigured into a POI format suitable for each application.

In addition, existing applications provide POI contents to a user unilaterally according to a predetermined method of each application. Therefore, it is difficult to provide POI content adaptive for an interest of the user.

RELATED LITERATURES

Patent Literature

KR 10-1134883 B1

SUMMARY

The present disclosure is directed to providing a content management device and method, which may configure universal POI content data so that the same POI content may be used in various applications.

In addition, the present disclosure is directed to providing a content management device and method, which may classify and display POI contents according to an interest of the user so as to provide POI contents suitable for the interest of the user.

In one aspect, according to an embodiment of the present disclosure, there is provided a content management method, which includes: obtaining data for a content including a plurality of point-of-interest (POI) and a plurality of POI document associated with each of the plurality of POIs; obtaining at least one level-of-detail (LOD) information which allows the content to be displayed according to an interest of the user; and determining a display format for the content based on the LOD information, wherein the LOD information includes information for the interest level of the user with regard to the content, and the interest level is independent from a scale level of a map at which the content is displayed.

In addition, according to an embodiment of the present disclosure, there is also provided a content management device, which includes: a content management unit configured to obtain data for a content including a plurality of point-of-interest (POI) and a plurality of POI document associated with each of the plurality of POIs; a LOD information management unit configured to obtain at least one level-of-detail (LOD) information which allows the content to be displayed according to an interest of the user; and a display format determination unit configured to determine a display format for the content based on the LOD information, wherein the LOD information includes information for the interest level of the user with regard to the content, and the interest level is independent from a scale level of a map at which the content is displayed.

According to the present disclosure, the content management device may allow the same POI content to be used in various applications by configuring universal POI content data.

In addition, according to the present disclosure, the content management device may provide POI contents suitable for an interest of the user by classifying and displaying POI contents according to the interest of the user. In other words, it is possible to provide a user-customized service.

BRIEF DESCRIPTION OF THE DRAWINGS

FIG. 6 shows exemplary content data.

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein.

The terms used in the present disclosure are selected as most common terms generally used in the art, which however may differ as intended by those skilled in the art or according to custom or new technologies. In addition, in special cases, a term arbitrarily chosen by the applicant can be used, and in this case, its meaning will be explained in a suitable portion of this specification. Therefore, the terms used in the present disclosure should be interpreted based on substantial meanings of the terms and overall contents of the present disclosure, without being limited to the expressions of the terms.

In the present disclosure, a content management device may classify contents according to an interest of the user and provides interest information about contents suitable for the interest of the user. In the present disclosure, the content management device may use a level-of-detail (LOD) model in order to process contents according to the interest of the user and provide interest information about contents suitable for the interest of the user.

In the present disclosure, a point of interest (POI) may be a specific point location at which a user may find an interest or usefulness. For example, the POI may include an airport, a bakery, a restaurant, a hotel, other main facilities, and useful or important interest points. In addition, in the present disclosure, a POI document means a document associated with POI. For example, the POI document may be a document containing a text, multimedia, web-linked data associated with POI. Hereinafter, a content including POI and POI document will be generally called POI content.

In the present disclosure, in order to express an interest of the user about the POI content, LOD concept is used. In a traditional computer graphics field, the LOD expresses objects at a long distance simply on the assumption that objects at a long distance are unclearly viewed in comparison to objects at a short distance. In the present disclosure, the interest of the user about POI content may be expressed by using the LOD. The content management device of the present disclosure may select a LOD model suitable for an application from a plurality of LOD models, express an interest of the user about POI content by using the selected LOD model, and display interest information about the POI content, suitable for the interest of the user, on a map without accumulating the information in the map.

Figure 1:
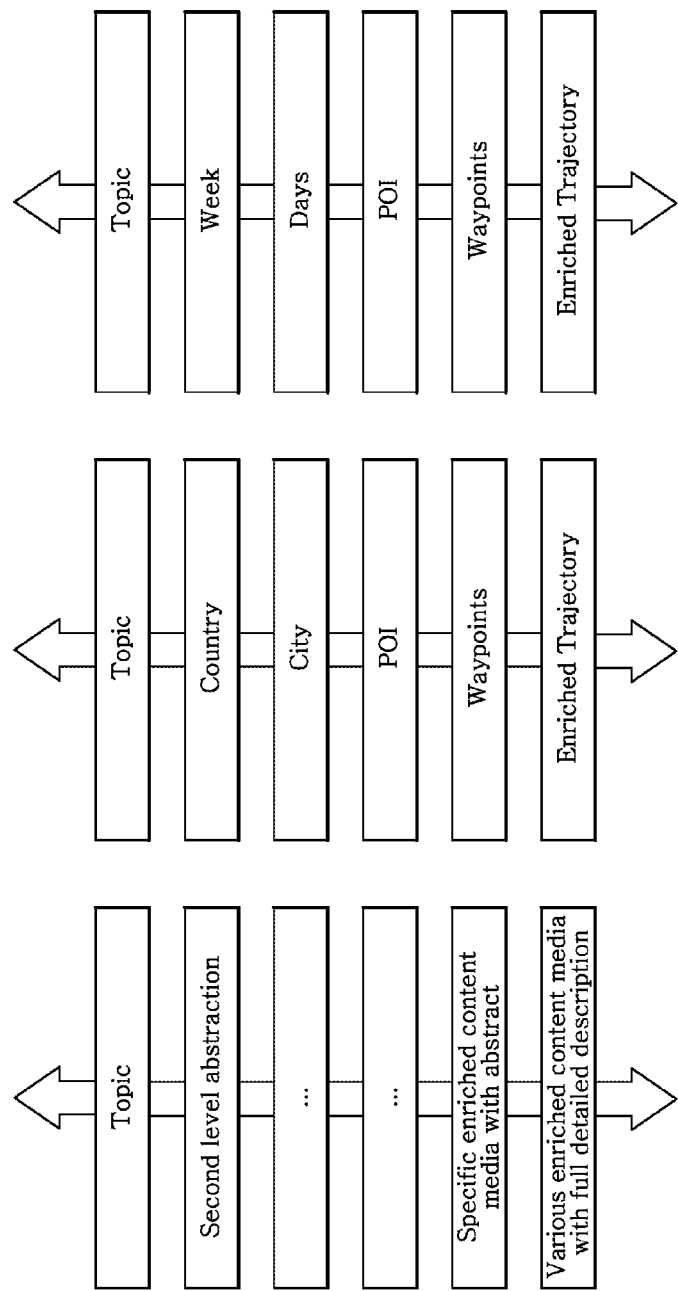
FIG. 1 shows an exemplary LOD model.

FIG. 1 shows an exemplary LOD model. In more detail, FIG. 1 shows a LOD model for classifying a single content into a plurality of information units. A left portion of FIG. 1 shows a generalized LOD model for classifying a single content into a plurality of interest levels about a single interest criterion, a middle portion of FIG. 1 shows a spatial LOD model for classifying a single content into an interest level of a space size about a spatial interest criterion, and a right portion of FIG. 1 shows a temporal LOD model for classifying a single content into an interest level of a time size about a temporal interest criterion. Next, terms used in an exemplary LOD model will be defined. In the present disclosure, these terms may be used for expressing an interest of the user about the content. The LOD model will be described later in detail with reference to FIG. 1.

First, an interest topic means a subject associated with a single content. For example, an interest topic of a travel-related content will be travel. In another example, an interest topic of a weather-related content may be weather information. In an embodiment, the interest topic may be a subject predefined by information included in the content. In other words, the interest topic may be information basically included in content data, instead of information input by a user. In another embodiment, the interest topic may also be a subject input by the user.

The interest criterion means a criterion of an interest of the user about a single content, and the interest criterion may be expressed as an axis as in FIG. 1 and thus may be called an interest axis. A single content may be classified by at least one interest criterion. In an embodiment, a single content may be classified by a spatial interest criterion as in the middle portion of FIG. 1 or a temporal interest criterion as in the right portion of FIG. 1. For example, a single travel-related content may be classified by a travel region which is a spatial interest criterion or a travel time which is a temporal interest criterion. In another embodiment, a single content may be classified by other various kinds of interest criteria. For example, a single travel-related content may be classified by an interest criterion such as travel expenses, travel place evaluation or the like. In another example, a single weather-related content may be classified by an interest criterion such as sensor kind, physical or chemical value of sensors or the like.

The interest level means the degree of an interest of the user about each interest criterion. As in the left portion of FIG. 1, a single interest criterion may be classified into at least one interest level. In this case, interest information corresponding to each interest level may be information with different detail levels. For example, as the level increases to a higher rank, information with a lower detail level, namely summarized information, may be provided. In an embodiment, as in the middle portion of FIG. 1, space serving as a single interest criterion may be classified into an interest level of a space size. For example, if the interest criterion is a travel region, the interest criterion may be classified into a plurality of interest levels such as city, country and continent. In another embodiment, as in the right portion of FIG. 1, time serving as a single interest criterion may be classified into an interest level such as a time range. For example, if the interest criterion is a travel time, the interest criterion may be classified into a plurality of interest levels such as day, week, month and year. In this case, each level may be associated with or included in an upper- or lower-rank interest. In addition, in another embodiment, a single interest criterion may be classified into an interest level according to the degree of another interest. For example, if the interest criterion has a sensor type, the interest criterion may be classified into a plurality of interest levels such as temperature sensor, humidity sensor and pressure sensor. In this case, each level may be an equivalent or exclusive relation to/from other levels.

The interest hierarchy means a hierarchical structure representing a hierarchical configuration of interest levels formed by each interest criterion. In an embodiment, the interest hierarchy may have a form of "tree", "multiple" or "only one", without being limited thereto. For example, in case of space and time used as interest criteria, a space size and a time range respectively serving as an interest level form upper- and lower-rank relations or inclusive relation with each other, and thus they may have an interest hierarchy in the form of "tree". This will be described later in detail with reference to FIGS. 5 and 6. In another example, in case of an interest criterion of a sensor type, sensor types of each level have equivalent or exclusive relations to/from each other, and thus they may have an interest hierarchy in the form of "multiple" or "only one".

The interest order means an application order of each interest criterion when a plurality of interest criteria is used. For example, if the interest criteria are space and time, the interest order may include information for determining a priority between the space and the time serving as interest criteria in order to classify contents and then obtain interest information. This will be described later in detail with reference to FIG. 9.

In conclusion, in general cases, a single content may be classified into a plurality of information units by using the interest criterion, the interest hierarchy and the interest level of the LOD model described above. Here, each information unit expressed with each block in FIG. 1 may represent a single LOD. In other words, as in the left portion of FIG. 1, a single content may be classified into a plurality of LODs, and any subject is set to a highest-rank level and then an abstract of a lower-rank about the subject may be set to a next level. In addition, in a further next level, a detailed content of the lower-rank level may be set. In other words, information may be provided so that the LOD of the highest-rank level expresses just a subject and the LOD in the lowest-rank level all information about the subject and additional explanation thereof. In other words, a single content may be classified in different expression forms according to various detail levels between the LOD of the highest-rank level and the LOD of the lowest-rank level.

Figure 2:
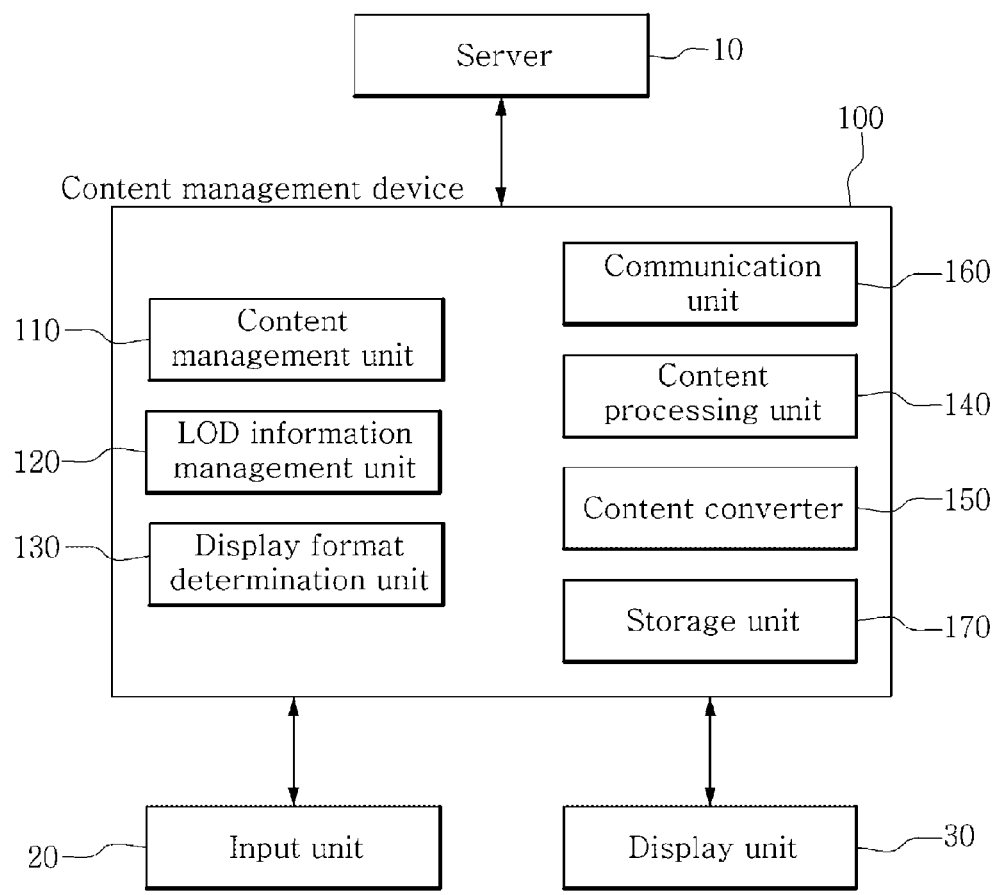
FIG. 2 shows a system including a content management device according to an embodiment of the present disclosure.

FIG. 2 shows a system including a content management device according to an embodiment of the present disclosure. In an embodiment, the content management device 100 may be a partial configuration of a user terminal which is a display device (for example, a smart phone or a smart pad) capable of displaying a map. In another embodiment, the content management device 100 may be a device distinguished from the user terminal. For example, the content management device 100 may be a server communication with the user terminal through a network.

Referring to FIG. 2, the content management device 100 includes a content management unit 110, a LOD information management unit 120, a display format determination unit 130 and a content processing unit 140. In addition, the content management device 100 may further include a content converter 150, a communication unit 160 and a storage unit 170. Here, the content converter 150, the communication unit 160 and the storage unit 170 may be optional.

The content management unit 110 may obtain data about content ("content data"). Here, the content data may include information about at least one POI and a POI document associated with each of the at least one POI. In addition, the content data may include information about a map and a multimedia content (an image or a moving picture) having location information. Here, obtaining content data may mean that the content data is generated, received or obtained in other ways.

In an embodiment, the content management unit 110 may generate content data in a predetermined way or receive content data stored in the storage unit 170. In another embodiment, the content management unit 110 may receive content data from an external server 10, namely a content server, through a network. For example, the content server may be an internal or external server including POI information using node.js. In addition, the content management unit 110 may obtain POI content from a geo-referenced document on the web, which is tagged to a universal resource locator (URL) of the POI. In addition, the content management unit 110 may obtain POI content from linked data which has the POI included in the content server as geographic information. In addition, the content management unit 110 may obtain POI content from data input by the user.

The LOD information management unit 120 may obtain at least one LOD information which may display content according to an interest of the user. Here, the LOD information means information expressing an interest of the user about the content. In more detail, a single content may be generally classified into a plurality of LODs by using the LOD model described above, and the LOD information may include information (content classification information) for classifying contents into a plurality of LODs according to the interest of the user or information (content display information) for displaying information about LOD suitable for the interest of the user among the classified contents. In other words, the LOD information may have a concept including the content classification information or the content display information.

In an embodiment, the LOD information management unit 120 may obtain first LOD information which expresses an interest of the user about POI. For example, the first LOD information may include information about an interest criterion and interest level of the user with respect to the POI. In addition, the first LOD information may further include information about an interest hierarchy and interest order of the user with respect to the POI. In another embodiment, the LOD information management unit 120 may receive second LOD information which expresses an interest of the user about the POI document. For example, the second LOD information may include information about an interest of the user level with respect to description of the POI document.

The LOD information management unit 120 may obtain LOD information stored in the storage unit 170. In addition, the LOD information management unit 120 may obtain LOD information from the user terminal or the external server 10, namely a LOD server. For example, the LOD information management unit 120 may obtain LOD information based on selection information of the user received through a POI panel, a timeline panel or a POI document panel displayed at the user terminal. This will be described later in detail with reference to FIGS. 7 to 10.

The display format determination unit 130 may determine a display format of the interest information about content based on the LOD information. Here, the display format may include information associated with display of the content. For example, the display format may include display attribute information such as content display location, content display color, content display size or the like. In an embodiment, the display format determination unit 130 may determine a display format of the interest information about the POI based on the first LOD information and determine a display format of the interest information about the POI document based on the second LOD information.

The content processing unit 140 may classify and visualize contents according to an interest of the user about the contents. The content processing unit 140 may classify and visualize contents based on the LOD information. In an embodiment, the content processing unit 140 may classify a plurality of POIs into at least one POI group based on the LOD information. In addition, the content processing unit 140 may classify a document associated with the POI into a POI group document associated with the POI group. In addition, the content processing unit 140 may visualize the POI group and/or the POI group document based on the display format. The content processing unit 140 will be described later in detail with reference to FIG. 3.

When POI and POI document are combined, the content converter 150 may divide the POI and the POI document. In an embodiment, the content converter 150 may divide content in which POI and POI document are combined into POI and POI document in order to reuse content having a format of another application. In another embodiment, the content converter 150 divide content in which POI and POI document are combined into POI and POI document in order to allow the POI to be identified by inherent identification information, instead of location information, reconfigure POI content based on the POI and construct a connection relation between the POI and the POI document. For example, the content converter 150 may divide POI content used in an existing application into a POI having a single identifier and a web document reference by the POI, and construct a connection relation between the POI and the POI document by tagging to the identifier of the POI.

By doing so, all documents referenced by POI, present on the web, may be used as content. In addition, by doing so, content used in other applications and linked data having geo-referenced information may be used as content of the POI. In addition, by doing so, it is possible to prevent content from being subordinate to an application. However, for this, the user should implement a converter suitable for each POI format of the geo-referenced content (for example, KML (Keyhole Markup Language), ESRI (Environmental Systems Research Institute)).

The communication unit 160 may perform communication with an external object. The content management unit 110, the LOD information management unit 120, the display format management unit 130, the content processing unit 140 or the like may directly communicate with the outside, but may perform communication with an external object by the support of the communication unit 160. The communication may include any communication method by which objects may be networked, without being limited to communication methods or kinds (wired/wireless communication, 3G, 4G or the like) as long as a communication function is ensured.

The storage unit 170 plays a role of storing information in the content processing device 100 and various kinds of information received from the external server 10 and the user terminal. In detail, overall information obtained while performing the content management unit 110, the LOD information management unit 120, the display format determination unit 130 and the content processing unit 140 or obtained as a result of the operations thereof may be stored.

In addition, the content processing device 100 may further include a user context information management unit (not shown) and a display information management unit (not shown). Here, the user context information management unit plays a role of managing user location information, moving direction information, and user context information such as experience history. Here, the display information management unit plays a role of receiving display information of the user terminal from the user terminal. In an embodiment, the display information management unit may receive display information which has been received from the user terminal and stored in the storage unit 170. Here, the display information is information in relation to resolution, horizontal and vertical length or the like of the display. Even though the same LOD information is possessed, if the user location information, the moving direction information, the user context information such as experience history, the display resolution or the display size should vary depending on situation, different user experiences are transmitted by the user, and thus it is required to display a suitable content in consideration of the user context and the display information together with the LOD information.

The system of the present disclosure may further include a user terminal (not shown). In an embodiment, the user terminal is a display device including an input unit 20 and a display unit 30 and may be separated from the content management device 100. In this case, the content management device 100 may communicate with the user terminal to transmit or receive data. The communication method may include any communication method by which objects may be networked, for example, wired/wireless communication, 3G, 4G or the like. In another embodiment, the user terminal may be a display device including an input unit 20, a display unit 30 and a content management device 100. In addition, the user terminal may further include a map processing unit (not shown).

The map processing unit may display a map on the display unit 30 of the user terminal, and the map may be expressed as a map viewer. In an embodiment, the map processing unit may request map data to the external server 10, namely the map server, and display a map on the display unit 30 of the user terminal. In an embodiment, the map processing unit may process a user interaction about scale level change of the map or location change of the map. In an embodiment, the map processing unit may be a map application or a navigation application. For example, the map processing unit may be a map application implemented using a Google map API.

The map processing unit may be separated from the content processing unit 140. By processing contents from the content processing unit 140 separated from the map processing unit, the content management device 100 of the present disclosure may provide contents according to an interest of the user, independent from the scale of the map.

The input unit 20 means a device for inputting an interest of the user about POI content in order to classify or display contents. In an embodiment, the user may make an input by means of a touch screen interface, a scroll and click interface, a button interface, and other communication methods.

The display unit 30 means a device for displaying visual information. In an embodiment, the display unit 30 may display information about contents according to the interest of the user and the map. In an embodiment, the display unit 30 may include at least one of a light-emitting diode (LED), an organic light-emitting diode (OLED), a liquid crystal display (LCD), an electronic ink, and a flexible display. In addition, the display unit 30 may include a touch-sensitive display unit and detect an input of a user who touches the display unit.

In addition, the content management device 100 may further include at least one processor (not shown) and at least one memory (not shown). The processor may control at least one provided at the content management device 100. In more detail, the processor may control each unit described above as well as data transmission and/or reception among those units. In addition, the processor may perform content processing methods executed by the content processing unit 140 as illustrated in FIG. 2. Therefore, hereinafter, it may be expressed that the processor controls at least one included in the content management device 100, and the processor may be regarded in the same light as the content management device 100 or the content processing unit 140. In other words, each step executed by the content processing unit 140 may also be executed by at least one processor.

Figure 3:
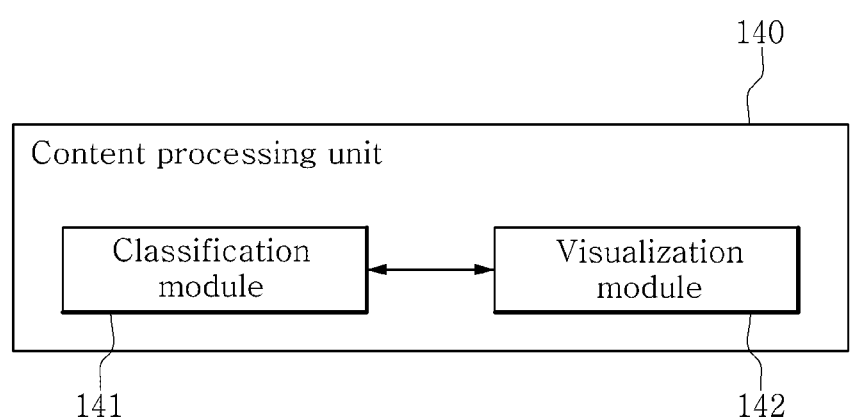
FIG. 3 shows a content processing unit of the content management device according to an embodiment of the present disclosure.

FIG. 3 shows a content processing unit of the content management device according to an embodiment of the present disclosure. Referring to FIG. 3, the content processing unit 140 may include a classification module 141 and a visualization module 142.

The classification module 141 may classify a plurality of POIs into at least one POI group. The classification module 141 may hierarchically classify a plurality of POIs into POI groups of various levels. In addition, the classification module 141 may classify a POI document associated with the POI into a POI group document associated with POI groups of various levels. Here, the classification may have a concept including categorizing, grouping and summarizing.

In more detail, the classification module 141 may obtain POI content from the content management unit. Here, the POI content may include POI and a POI document associated with the POI. In an embodiment, the POI and the POI document may be in a separated state. In another embodiment, the POI and the POI document may be in a coupled state. If the POI and the POI document are in a coupled state, the content management device may separate the POI and the POI document from the POI content by using the content converter, and provide the separated POI and POI document to the classification module 141. This has been described above with reference to FIG. 2 and thus is not described in detail here.

In addition, the classification module 141 may aggregate the obtained POI contents. The classification module 141 may aggregate information included in the obtained POI and POI document. In an embodiment, the classification module 141 may aggregate POI contents by mashing up the POI contents. Here, the POI may include identification information, display information, location information or the like of the POI. This will be described later in detail with reference to FIG. 4.

In addition, the classification module 141 may obtain LOD information from the LOD information management unit. The LOD information may include information about an interest criterion and interest level of the user with regard to POI. In another embodiment, the LOD information may further include at least one of information about an interest subject, an interest hierarchy and an interest order of the user with regard to POI.

In addition, the classification module 141 may classify a plurality of POIs into at least one POI group based on the obtained LOD information and the aggregated POI contents, and classify a POI document associated with the plurality of POIs into a POI group document associated with at least one POI group. In an embodiment, the classification module 141 may generate a POI group content including a POI group document having a POI group and a description about the POI group based on the obtained LOD information and the aggregated contents by a POI builder. In an embodiment, the classification module 141 may classify POIs from a most detail level to a most general level according to an interest criterion and an interest level. At this time, the most general level may be set as a higher-rank interest level.

Hereinafter, an embodiment in which a classification model classifies POI and POI document into two levels according to the LOD information will be described. However, this is just an embodiment, and it is obvious that the classification model may POI and POI document into more levels according to the LOD information.

In an embodiment, the classification module 141 may classify a plurality of POIs into a first POI group based on the obtained LOD information and the aggregated POI contents, and classify a POI document into a first POI group document associated with the first POI group. In addition, the classification module 141 may classify a plurality of POIs into a second POI group in a higher level than the first POI group based on the obtained LOD information and the aggregated POI contents, and classify a POI document into a second POI group document associated with the second POI group. Here, the POI may include most detailed description. In addition, a POI group in a higher level may include more general or inclusive description. For example, the second POI group may include more general or inclusive description in comparison to the first POI group, and the first POI group may include more general or inclusive description in comparison to individual POI.

In addition, the classification module 141 may allocate an interest level to each of group contents including POI groups of various levels and group document associated with the POI groups. In an embodiment, the classification module 141 may allocate the first POI group content including the first POI group and the first POI group document to a first interest level. In addition, the classification module 141 may allocate the second POI group content including the second POI group and the second POI group document to a second interest level.

In an embodiment, the interest level may be independent from a scale level of the map. In an embodiment, the interest level corresponds to a display level. For example, the first interest level may correspond to a first display level, and the second interest level may correspond to a second display level. Here, the display level means a level representing the degree of content display.

By doing so, the content management device 100 of the present disclosure may change a detail level of content according the change of an interest of the user level, instead of the change of a scale level of the map (for example, the change of a scale of the map). In other words, in the present disclosure, by separating the map scale and the user interest level from each other, it is possible to solve a problem that a user context is easily lost when content is changed according to a scale of a map instead of an interest of the user. In addition, in the present disclosure, a user context may be maintained by changing the provided content information based on an interest of the user within the same map scale.

In addition, the classification module 141 may summarize the POI document or the POI group document based on the LOD information. Here, the LOD information may further include information about a document summary level. For example, if the document summary level is a single level and the POI document includes a plurality of images, the classification module 141 may determine a representative image among a plurality of images based on the obtained document summary information, and generate a single summary document including only the representative image. In another example, if the document summary level is two levels level and the POI document includes a plurality of images, the classification module 141 may generate a first level summary document including a group of first level representative images generated from the plurality of images and a second level summary document including a group of second level representative images generated from the first level summary document.

In addition, the classification module 141 may determine information about the displayed content based on the LOD information. Here, the LOD information may further include information about a display level. Here, the display level means a level representing the degree of content display. In an embodiment, the display level corresponds to the interest level. For example, the first display level may correspond to a first interest level, and the second display level may correspond to a second interest level.

The visualization module 142 may display the first POI group or the second POI group based on the display level. For example, if the first display level is obtained, the classification module 141 may display the first POI group allocated to the first interest level corresponding to the first display level. In another example, if the second display level is obtained, the classification module 141 may display a second POI group allocated to the second interest level corresponding to the second display level. At this time, the visualization module 142 may generate at least one indication feature representing at least one POI group.

Here, the indication feature may have various patterns to represent the POI group on the display unit. For example, the indication feature may include at least one of a region surrounding POIs included in the POI group, a marker corresponding to the POI group and a text about the POI group. In an embodiment, the text about the POI group may be located at a lower end of the marker and represent information about the number of POIs selected by the user and the number of entire POIs belonging to the POI group. In an embodiment, the region surrounding POIs included in the POI group may be expressed as a circle surrounding POIs from the center of the POIs. In addition, if POI groups are close to each other and thus not easily distinguished, the visualization module 142 may not display each POI group with a marker but may display only a text at a location of each POI group. After that, if the text is selected by a user input, the visualization module 142 may display a marker corresponding to the selected text.

In an embodiment, the visualization module 142 may generate at least one feature representing at least one POI group by means of a feature handler. For example, the visualization module 142 may generate a first feature representing the first POI group and a second feature representing the second POI group. Here, the first feature may include at least one of a first region, a first marker and a first text. In addition, the second feature may include at least one of a second region, a second marker and a second text. This visualization will be described later in detail with reference to FIGS. 7 to 10.

In addition, the classification module 141 may include at least one of the POI and the POI groups based on the LOD information. Here, the LOD information may further include selection information for selecting one of the POI and the POI group. The classification module 141 may select one of the POI and the POI group based on the LOD information received through the user interface. In an embodiment, the classification module 141 may select one of the POI, the first POI group and the second POI group. In addition, the classification module 141 may select a POI document associated with the selected POI or a POI group document associated with the selected POI group. In an embodiment, the classification module 141 may select a single document among the POI document, the first POI group document and the second POI group document.

If the POI or the POI group is selected by the user, the visualization module 142 may generate a POI document or a POI group document in a preset format. In an embodiment, the visualization module 142 may generate a document provided to the user when the POI group is selected by a document handler. For example, the visualization module 142 may generate the POI document or the POI group document as a HTML document, without being limited thereto. In addition, the visualization module 142 may transmit the generated feature or HTML document to the map processing unit. In addition, the visualization module 142 may be configured as a plurality of modules so as to generate a feature and a HTML document adaptive to an application. By doing so, visualization may be performed suitable for a purpose of an individual application.

In addition, the classification module 141 may determine a summary document about the selected document based on the LOD information. Here, the LOD information may further include information about a summary level of the document. Here, the summary level means a level representing a summary degree of the document. In an embodiment, the summary level corresponds to a document summary level. For example, the first summary level may correspond to a first document summary level, and the second summary level may correspond to a second document summary level.

The visualization module 142 may display the corresponding summary document of the selected document based on the input summary level. For example, if the POI is selected and the first summary level is obtained, the visualization module 142 may display a first level summary document of the POI document. In another example, if the first POI group is selected and the first summary level is obtained, the visualization module 142 may display a first level summary document of the first POI group.

Figure 4:
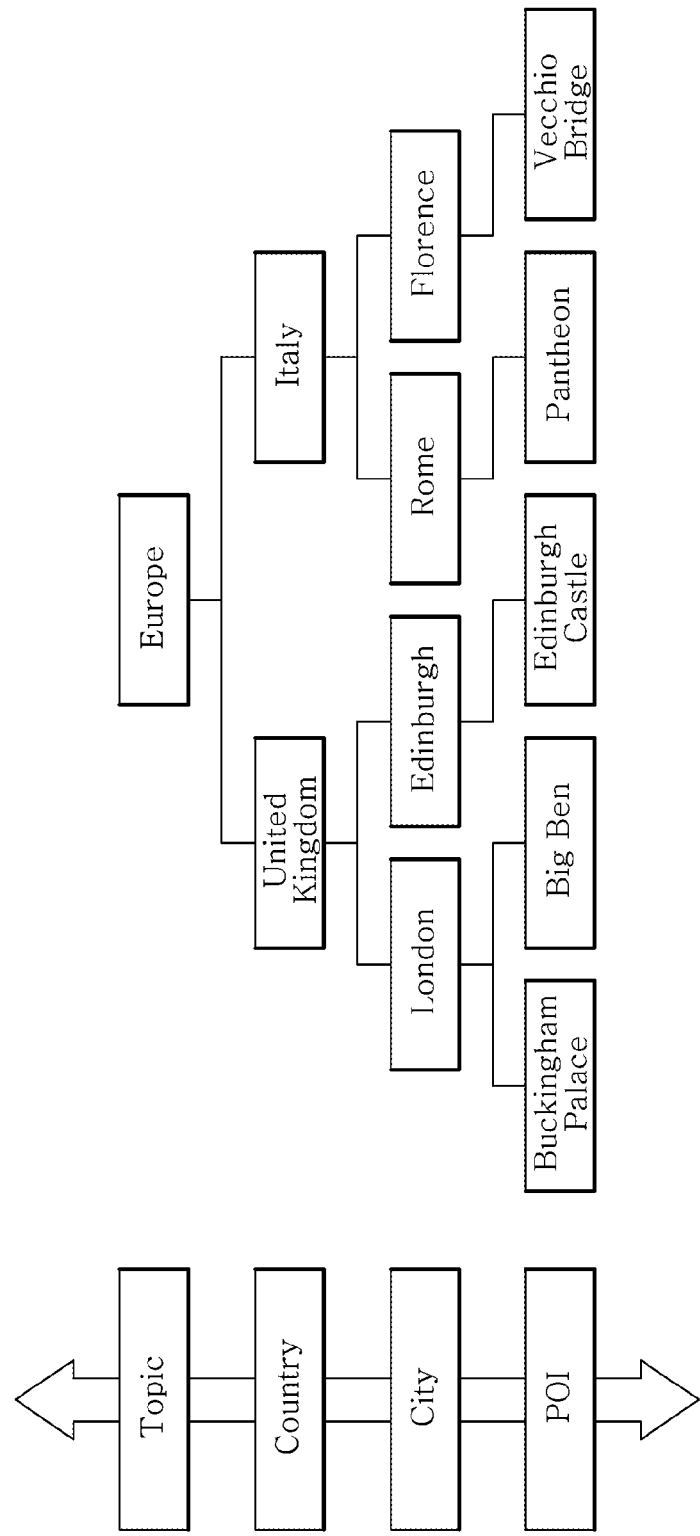
FIG. 4 illustrates a method for the content management device to classify content data by using a level-of-detail (LOD) model, according to an embodiment of the present disclosure.

FIG. 4 illustrates a method for the content management device to classify content data by using a level-of-detail (LOD) model, according to an embodiment of the present disclosure. In more detail, a left portion of FIG. 4 depicts an exemplary spatial LOD model, and a right portion of FIG. 4 depicts a method for the content management device to hierarchically classify Europe travel contents by using the exemplary spatial LOD model.

Referring to the left portion of FIG. 4, the exemplary LOD model is a spatial LOD model in which the interest criterion is a space (for example, a travel region) and the interest level is a space size (for example, city or country), as in the middle portion of FIG. 1. In addition, the interest hierarchy has a tree form.

Referring to the right portion of FIG. 4, the exemplary Europe travel content include information about a Buckingham Palace POI, a Big Ben POI, an Edinburgh Castle POI, a Pantheon POI and a Vecchio Bridge POI of a lowest-rank level. The content management device may classify the Europe travel contents as follows by applying the spatial LOD model of FIG. 1.

First, the content management device may classify POIs into first POI groups respectively belonging to a city level. In this case, the Buckingham Palace POI and the Big Ben POI located at London may be classified into a London POI group, the Edinburgh Castle POI located at Edinburgh may be classified into an Edinburgh POI group, the Pantheon POI located at Rome may be classified into a Rome POI group, and the Vecchio Bridge POI located at Firenze may be classified into a Firenze POI group. In an embodiment, as shown in FIG. 6, if data of each POI includes city information, the content management device may classify each POI into a first POI group by using the corresponding city information. In another embodiment, if data of each POI does not include city information, the content management device may classify each POI into a first POI group by determining a city including each POI by means of name analysis of each POI, location analysis of each POI, other Symantec analysis or the like.

Next, the content management device may classify POIs into a second POI groups which belongs to a country level that is a higher-rank level in comparison to the city level. In this case, the Buckingham Palace POI, the Big Ben POI and the Edinburgh Castle POI located in England may be classified into an England POI group, and the Pantheon POI and the Vecchio Bridge located in Italy may be classified into an Italy POI group. Next, the content management device may classify each POI with a subject that is a highest-rank level. In this case, each POI corresponding to Europe travel data may be classified into a subject about Europe travel. In an embodiment, as shown in FIG. 6, if data of each POI includes country information, the content management device may classify each POI into a second POI group by using the corresponding country information. In another embodiment, if data of each POI does not include country information, the content management device may classify each POI into a second POI group by determining a country including each POI by means of name analysis of the POI, location analysis of the POI, other Symantec analysis or the like.

Figure 5:
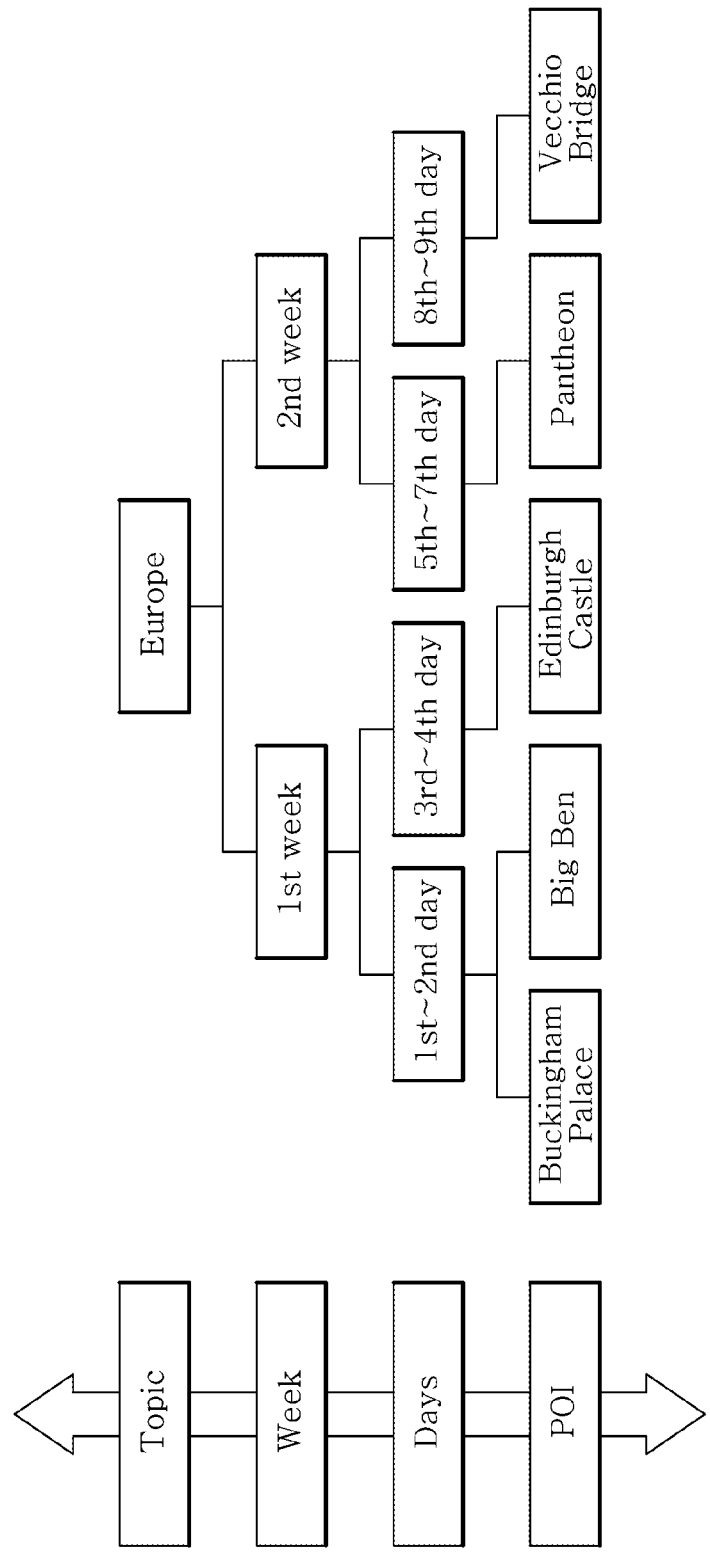
FIG. 5 illustrates a method for the content management device to classify content data by using a LOD model, according to another embodiment of the present disclosure.

FIG. 5 illustrates a method for the content management device to classify content data by using a LOD model, according to another embodiment of the present disclosure. In more detail, the left portion of FIG. 5 shows an exemplary temporal LOD model, and the right portion of FIG. 5 illustrates a method for the content management device to hierarchically classify Europe travel-related contents by using the exemplary temporal LOD model. The Europe travel content of FIG. 5 is identical to the Europe travel content of FIG. 4.

Referring to the left portion of FIG. 5, the exemplary LOD model is a temporal LOD model in which an interest criterion is time (for example, travel time) and an interest level is a time range (for example, day or week), as in the right portion of FIG. 1. In addition, the interest hierarchy has a tree form.

Referring to the right portion of FIG. 5, the exemplary Europe travel content includes the same information as the Europe travel content of FIG. 4. The content management device may classify the Europe travel content as follows by applying the temporal LOD model.

First, the content management device may classify POIs into first POI groups belonging to a time level of day intervals. In this case, the Buckingham Palace POI and the Big Ben POI which is a travel place of first and second days may be classified into a first-to-second day POI group, and the Edinburgh Castle POI which are travel places of third and fourth days may be classified into a third-to-fourth day POI group, the Pantheon POI which is a travel place of fifth to seventh days may be classified into a fifth-to-seventh day POI group, and the Vecchio Bridge POI which is a travel place of eighth and ninth days may be classified into an eighth-to-ninth day POI group. In an embodiment, as in FIG. 6, if data of each POI includes day information, the content management device may classify each POI into a first POI group by the corresponding day information.

Next, the content management device may classify POIs into second POI groups belonging to a time level of week intervals, which is a higher-rank level in comparison to day intervals. In this case, the Buckingham Palace POI, the Big Ben POI and the Edinburgh Castle POI which are travel places of a first week may be classified into a first week POI group, and the Pantheon POI and the Vecchio Bridge POI which is a travel place of a second week may be classified into a second week POI group. Next, the content management device may classify POIs into a subject which is a highest-rank level. In this case, POIs corresponding to Europe travel data may be classified into a subject about the Europe travel. In an embodiment, as in FIG. 6, if data of each POI includes week information, the content management device may classify each POI into a second POI group by using the corresponding week information.

From FIGS. 4 and 5, it may be understood that the content management device may classify the same content data into different LOD models, and thus information of different criteria and levels may be provided to a user. Therefore, in order to provide a content suitable for the interest of the user among various contents, the concepts of the above LOD model may be used.

FIG. 6 shows exemplary content data according to an embodiment of the present disclosure. In more detail, FIG. 6 shows exemplary content data including information about POI and POIs. Here, POIs means a group of POI. In addition, Table 1 below shows information about each attribute included in POI and POIs of FIG. 6.

TABLE 1

| Class | Attribute | Description | Type | Example value |
|---|---|---|---|---|
| POI | id | Identifier of POI | URI | http://example.com/poi/BuckinghamPalace |
| | displayName | Display name of POI | String | Buckingham Palace |
| | geometry | Location of POI | GeoJSON | {"type": "Point", "coordinates": [−0.14189, 51.501364]} |
| | lod | Information of interest level of POI | String Array | ["geographic/country/uk", "geographic/city/London"] |
| | description | Arrangement of POI document | URI Array | ["http://example.com/poi/BuckinghamPalace#title", "http://example.com/poi/BuckinghamPalace#text"] |
| | starttime | Time when POI came into being | Datetime | March 1 2014 15:57:47 |
| | endtime | Time when POI ceased to exist | Datetime | March 3 2014 15:57:47 |
| | content | Additional information | URI Array | Information for individual sensor |

TABLE 1-continued

| Class | Attribute | Description | Type | Example value |
|---|---|---|---|---|
| POIs | id | Identifier of POIs about POI | URI | http://example.com/europetour |
|  | displayName | Display name of POIs | String | Europe Tour |
|  | pois | URI arrangement of POI included in POIs | URI Array | ["http://example.com/poi/BuckinghamPaLace", "http://example.com/poi/BigBen"] |
|  | order | Order of POIs | Boolean | true |

First, referring to Table 1, "id" attribute (attribute) of POI means an identifier of the POI. Here, the identifier of POI may include inherent identification information, instead of location information which is general identification information of POI. For example, the identification information of POI may be URL information of a POI document. By doing so, content data may be classified into POI and POI document, and each POI may be classified according to an interest of the user. In addition, "displayName" attribute of POI means a display name of the POI. In addition, "geometry" attribute of POI means a location of the POI. In addition, "lod" attribute of POI means information about an interest level for classifying each POI according to an interest of the user. In addition, "description" attribute of POI means URI arrangement of POI documents having various detail levels. In addition, content attribute of POI means additional information (for example, information about individual sensors) of the POI.

In addition, referring to Table 1, "id" attribute of POIs means an identifier of a POI group. Here, the identifier of POIs may have URI as a single identifier. In addition, "displayName" attribute of POIs means a display name of the POIs. In addition, "pois" attribute of POIs means URI arrangement of POI included in the POIs. "order" attribute of POIs represents whether an arrangement order of each POI described in the "pois" attribute has a meaning. For example, if an arrangement order of each POI has a meaning as in the case where each POI is a travel place in a travel course, the "order" attribute of POIs has a "true" value. In addition, if an arrangement order of each POI does not have a meaning as in the case where each POI is a location of a weather sensor, the "order" attribute of POIs has a "false" value. If the "order" attribute has a "true" value, the user may observe each POI belonging to the POIs according to the arrangement order.

Hereinafter, by using Table 1, the POIs and POI data of FIG. 6 will be described. First, data 610 of POIs is described. The POIs uses URL of a document associated with the POIs as an identifier and has a display name of "Europe travel". In addition, the POIs include a Buckingham Palace POI, a Big Ben POI, an Edinburgh Castle POI, a Pantheon POI and a Vecchio Bridge POI. In addition, since the "order" attribute of the POIs has a "true" value, an arrangement order of each POI has a meaning. Therefore, the user may observe information of each POI in the arrangement order of the Buckingham Palace POI, the Big Ben POI, the Edinburgh Castle POI, the Pantheon POI and the Vecchio Bridge POI. The data of POIs may be utilized as information representing an interest topic of content data.

In addition, data 620 of the Buckingham Palace POI arranged in the first order will be described. First, seeing the id and "displayName" attribute of the POI, the POI may use URL of a POI document as an identifier and Buckingham Palace as a display name. In addition, seeing the "geometry" attribute of POI, the POI may include coordinate-type location information. Therefore, the POI may be displayed on a map based on the location information. In addition, seeing the "lod" attribute of POI, the POI may include information about London which is a city at which the POI is located and England which is a country in which the POI is located. Therefore, if the spatial LOD model of FIG. 4 is applied to the POI, the POI may be classified into a London POI group belonging to a city level and an England POI group belonging to a country level, as in FIG. 4. In addition, seeing the "lod" attribute of POI, the POI may include first day information, which is information about day staying at the corresponding POI during the Europe travel, and first week information, which is information about a week staying at the corresponding POI during the Europe. Therefore, if the temporal LOD model of FIG. 5 is applied to the POI, the POI may be classified into a first-to-second day POI group, which is a time level of day intervals, and a first week POI group, which is a time level of week intervals, as in FIG. 5. In addition, the POI may include information about a POI document having detail levels of a subject, a text or a media. In addition, the POI may not include additional information.

In addition, the above procedure in relation to the Buckingham Palace POI may also be applied to data 630 of the Big Ben POI arranged later, and thus the Big Ben POI is not described in detail here. Similarly, each data about the Edinburgh Castle POI, the Pantheon POI and the Vecchio Bridge POI may also be arranged in the same way, though not described in detail here. However, the content data about POIs and POI of FIG. 6 is exemplary data, and actual data may not include a part of information contained in the exemplary data or may further include at least one information not contained in the exemplary data. In other words, the content data is not limited to the above embodiments.

Table 2 below shows an exemplary LOD model about travel-related content.

TABLE 2

| interest criterion | space | time |
|---|---|---|
| interest hierarchy |  | Tree |
| interest level | subject | subject |
|  | country | week |
|  | city | day |
|  | POI | POI |

Referring to Table 2, the LOD model may include two interest criteria such as space and time. First, the space serving as an interest criterion may include at least one interest level. For example, the space serving as an interest criterion may include four interest levels such as a subject, a country, a city and POI. In addition, the space serving as an interest criterion may have a "Tree" interest hierarchy. Next, the time serving as an interest criterion may include at least one interest level. For example, the time serving as an interest criterion may include four interest levels such as a subject, a week, a day and POI. In addition, the time serving as an interest criterion may have a "Tree" interest hierarchy.

FIG. 7 illustrates a method for the content management device to display content information for POI according to an embodiment of the present disclosure. In an embodiment, the content management device may display content information through a display unit of a user terminal. A display screen 700 of FIG. 7 may display a map 710, a POI panel 720 and content information 731, 732, 733, 734. Here, the POI panel 720 may be a panel generated based on the spatial LOD model of Table 2. In an embodiment, the POI panel 720 may include blocks 721 representing at least one interest level about space serving as an interest criterion, a check box 722 included in the at least one block, and a slider bar 723 representing a display level, without being limited thereto. The user may select an interest level about space serving as an interest criterion by choosing a check box and select a display level of the content information by adjusting a level of the slider bar.

In addition, the content data of FIG. 7 may be data about a Europe travel. In FIG. 7, each travel destination in the Europe travel data is assumed as POI. In FIG. 7, it is assumed that the map has a fixed scale. In FIG. 7, the user may select a country or a city as an interest level with regard to the space serving as an interest criterion through the check box of the POI panel 720. In this case, the content management device may obtain LOD information based on the selection of the user and process POI into content information suitable for the interest of the user based on the LOD information. This has been described in detail above with reference to FIG. 4.

Figure 7A:
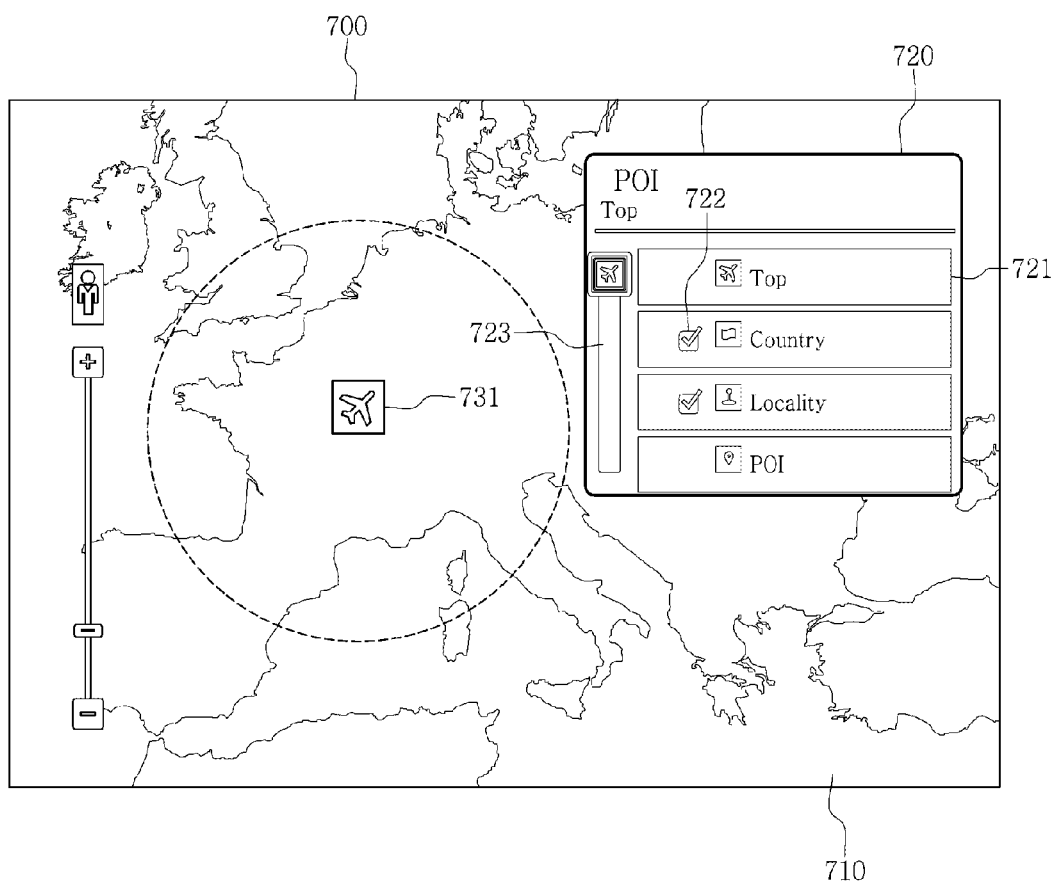
FIGS. 7A-7D illustrate a method for the content management device to display content information for POI according to an embodiment of the present disclosure.

Referring to FIG. 7a, the user may select a subject level, which is a highest-rank level, as a display level by using the slider bar of the POI panel 720. In this case, the content management device may display content information 731 about a subject POI belonging to the subject level on the map 710, like the display screen 700 of FIG. 7a. Here, the subject POI 731 may be a POI group including all POIs contained in the Europe travel data. In addition, the displayed content information may show the number of selected POIs among the entire POIs.

Figure 7B:
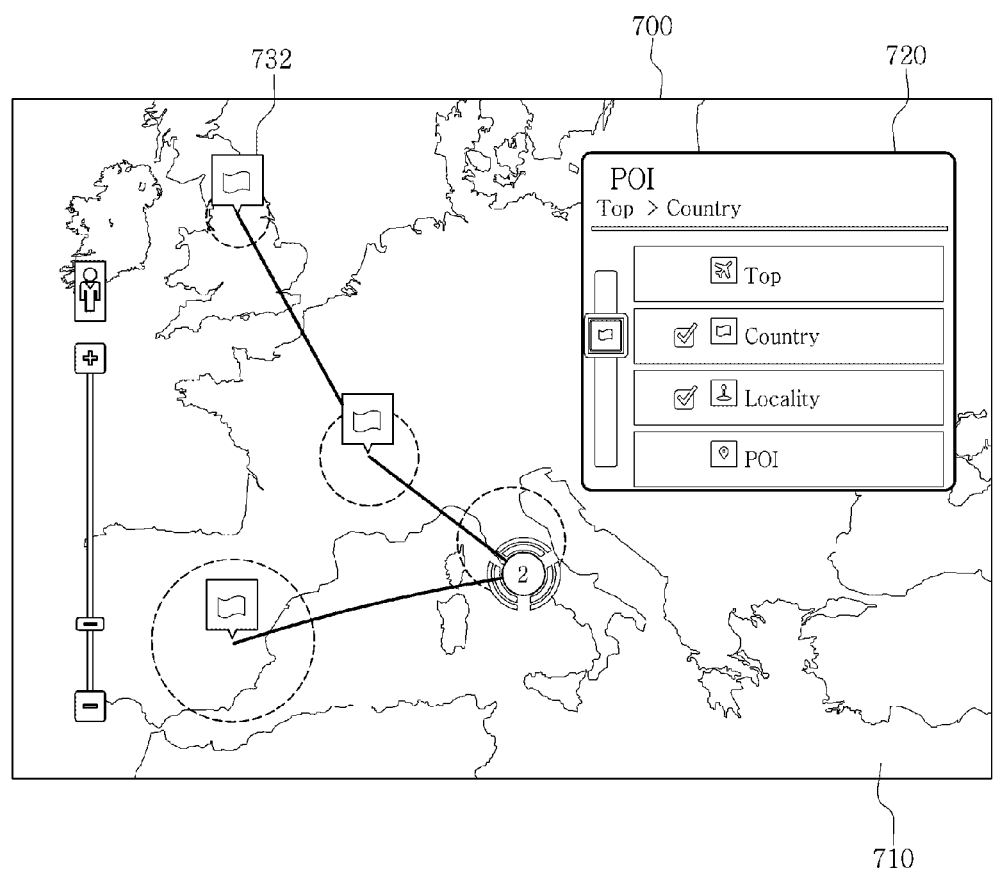

Referring to FIG. 7b, the user may select a country level, which is a next higher-rank level, as a display level by using the slider bar of the POI panel 720. In this case, the content management device may display content information 732 about a country POI group belonging to a country level on the map 710, as in the display screen 700 of FIG. 7b. Here, the country POI group may be a POI group which binds a plurality of POIs located in the same country. For example, the country POI group may be a POI group which binds travel destinations located in the same country (for example, England, France, Italy or Spain). In addition, the content information may include the number of selected POIs among POIs contained in each country.

Figure 7C:
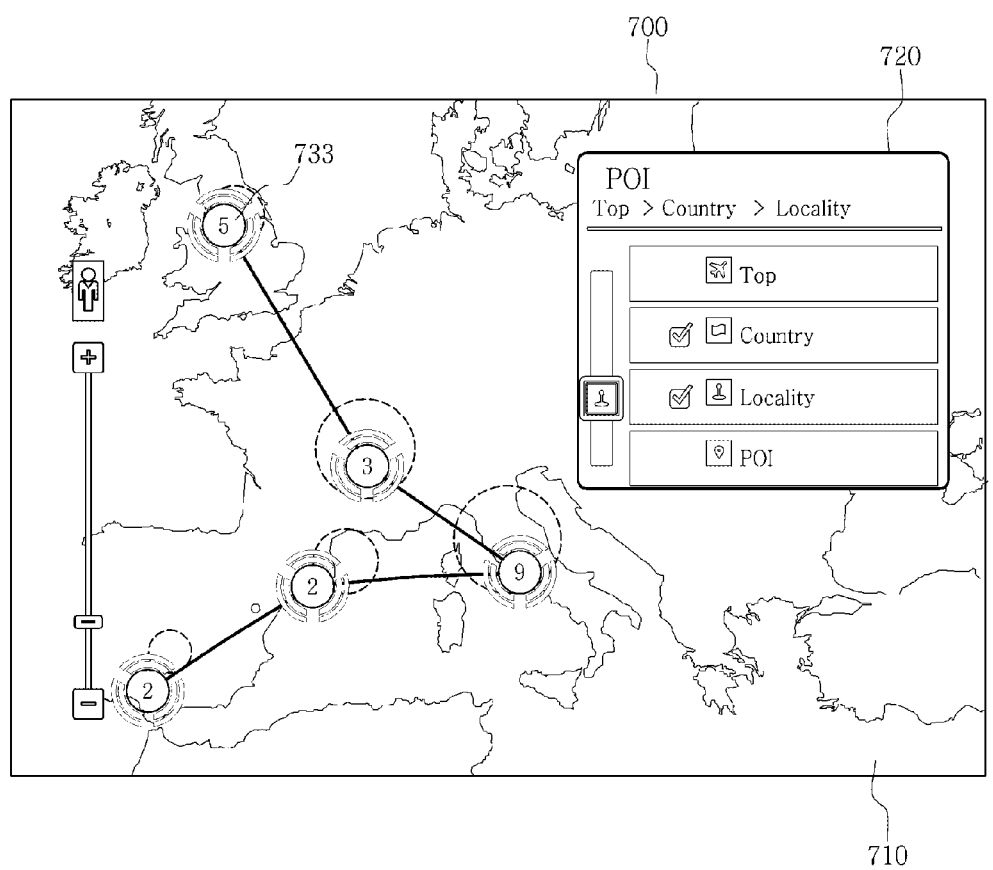

Referring to FIG. 7c, the user may select a city level, which is a next higher-rank level, as a display level by using the slider bar of the POI panel 720. In this case, the content management device may display content information 733 about a city POI group belonging to a city level on the map 710, as in the display screen 700 of FIG. 7c. Here, the city POI group may be a POI group which binds a plurality of POIs located at the same city. For example, the city POI group may be a POI group which binds travel destinations located at the same city (for example, London, Paris, Rome or Barcelona). In addition, the displayed content information may include the number of selected POIs among POIs contained in each city. In addition, if city POI groups are close to each other and thus not easily distinguished, the user terminal may not display each city POI group with a marker but may display only a text about a location of each city POI group. After that, if the text is selected, the user terminal may display a marker corresponding to the selected text. By doing so, it is possible to lessen any difficulty in obtaining information caused by the scale of the map.

Figure 7D:
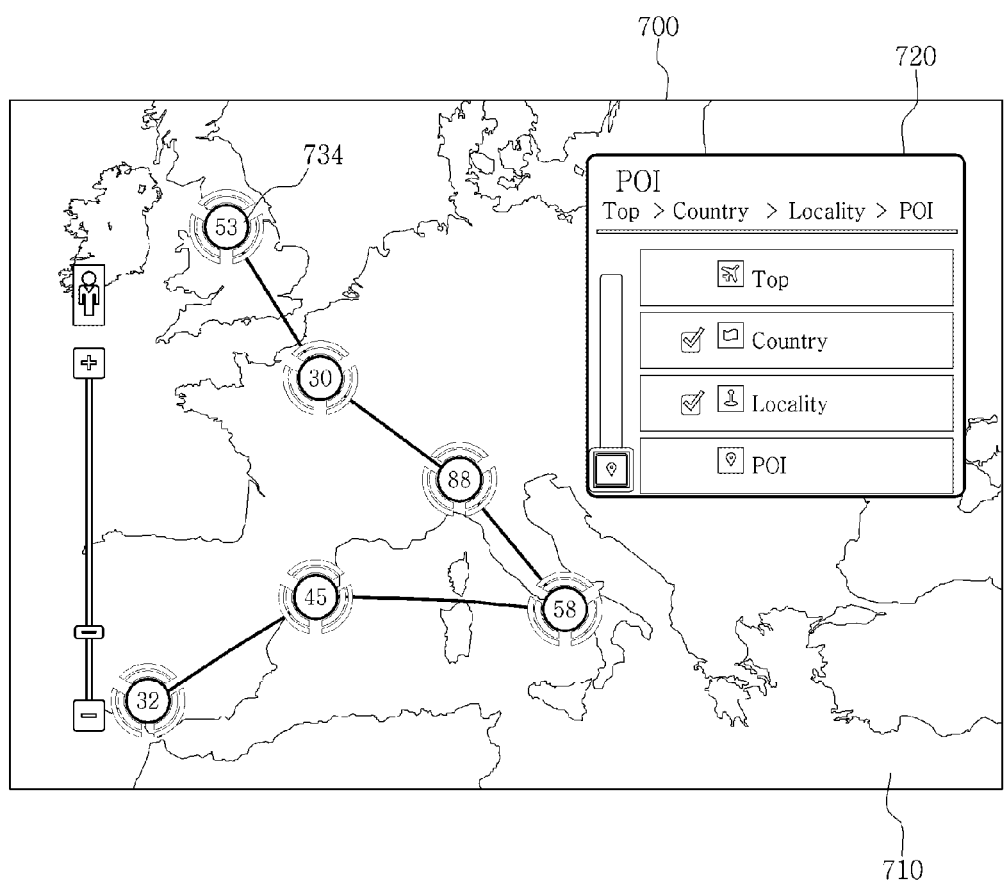

Referring to FIG. 7d, the user may select a POI level, which is a lowest-rank level, as a display level by using the slider bar of the POI panel 720. In this case, the content management device may display content information 734 about an individual POI belonging to a POI level on the map 710, as in the display screen 700 of FIG. 7d. For example, the individual POI may be a travel destination. In addition, the displayed content information may include the number of selected POIs among POIs included in each city. In addition, if individual POIs are close to each other and thus not easily distinguished, the user terminal may display only a text at the location of the POI, without displaying the individual POI with a marker.

FIG. 8 illustrates a method for the content management device to display content information for POI according to another embodiment of the present disclosure. In an embodiment, the content management device may display content information through the display unit of the user terminal. The display screen 800 of FIG. 8 may display a map 810, a timeline panel 820 and content information 831, 832, 833, 834. Here, the timeline panel 820 may be generated based on the temporal LOD model of Table 2. In an embodiment, the timeline panel 820 may include a timeline 821 representing at least one interest level about time serving as an interest criterion and at least one block 822 representing a display level, without being limited thereto. The user may select an interest level about time serving as an interest criterion by adjusting the timeline and select a display level of the content information by choosing at least one block.

In addition, the content data of FIG. 8 may be the Europe travel data identical to FIG. 7. In FIG. 8, each travel destination in the Europe travel data is assumed as POI. In FIG. 8, the map is assumed as having a fixed scale. In FIG. 8, the user may select month, week, day and time as an interest level through a timeline range with respect to the time serving as an interest criterion. In this case, the content management device obtains LOD information based on the selection of the user and process the POI into content information suitable for the interest of the user based on the LOD information. This has been described above in detail with reference to FIG. 2.

Figure 8A:
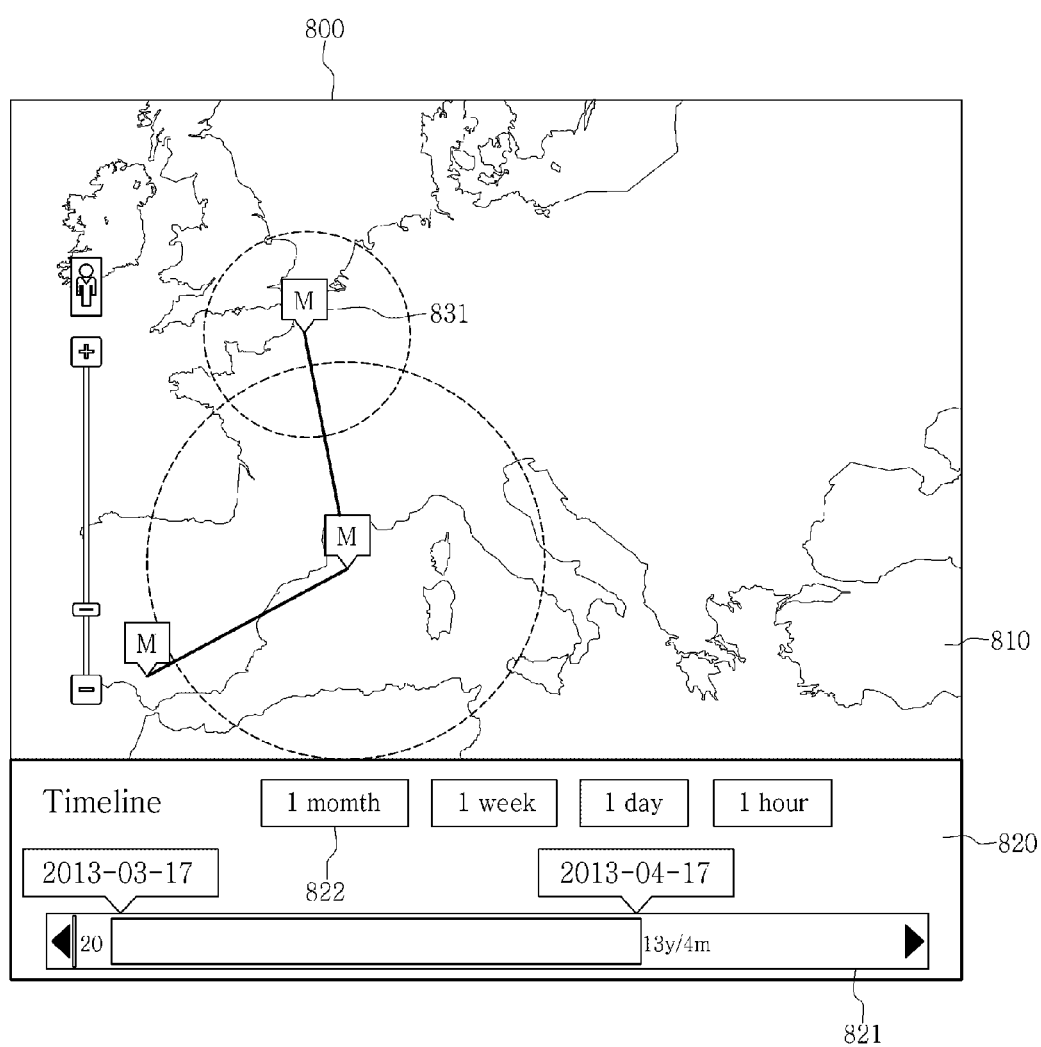
FIGS. 8A-8D illustrate a method for the content management device to display content information for POI according to another embodiment of the present disclosure.

Referring to FIG. 8a, the user may select a month level, which is a highest-rank level, as a display level by using the block of the timeline panel 820. In this case, the content management device may display content information 831 about a month POI group corresponding to the month level on the map 810, as in the display screen 800 of FIG. 8a. Here, the month POI group may be a POI group which binds POIs staying in the same month. For example, the month POI group may be a POI group which binds travel destinations staying in the same month (for example, March or April). In addition, the displayed content information may include the number of selected POIs among POIs included in each month.

Figure 8B:
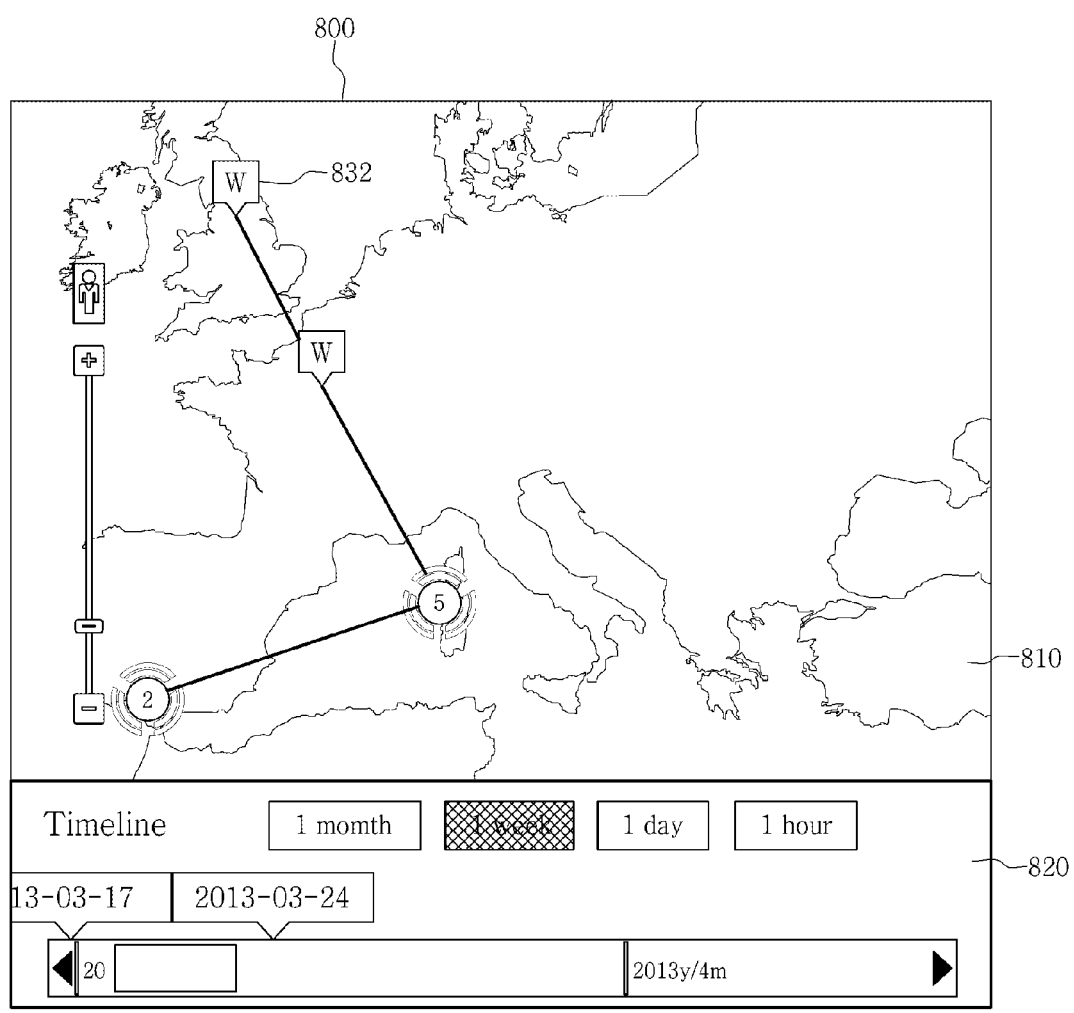

Referring to FIG. 8b, the user may select a week level, which is a next higher-rank level, as a display level by using the block of the timeline panel 820. In this case, the content management device may display content information 832 about a week POI group corresponding to the week level on the map 810, as in the display screen 800 of FIG. 8b. Here, the week POI group may be a POI group which binds POIs staying in the same week. For example, the week POI group may be a POI group which binds travel destinations staying in the same week (for example, a second week of March, a third week of March or a fourth week of March). In addition, the displayed content information may include the number of selected POIs among POIs included in each week.

Figure 8C:
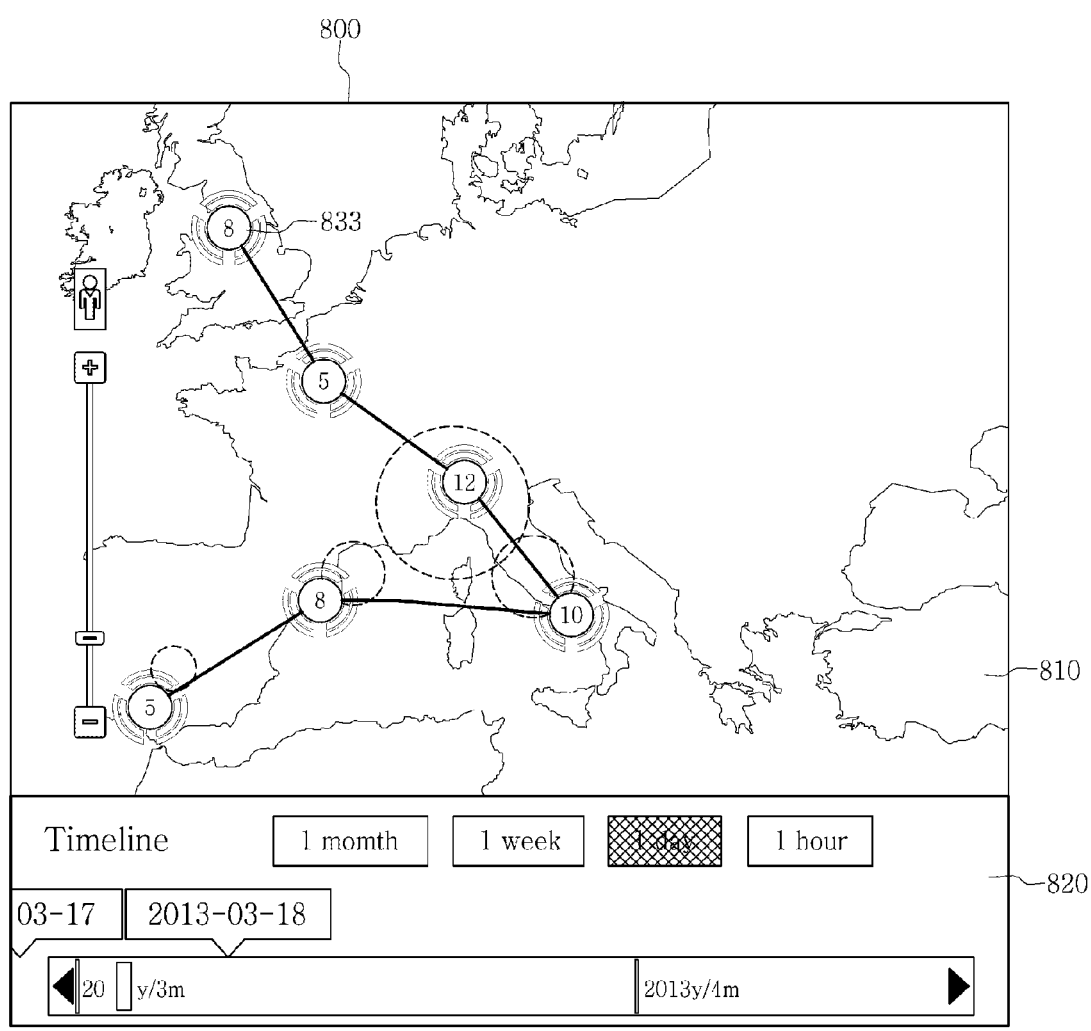

Referring to FIG. 8c, the user may select a day level, which is a next higher-rank level, as a display level by using the block of the timeline panel 820. In this case, the content management device may display content information 833 about a day POI group corresponding to the day level on the map 810, as in the display screen 800 of FIG. 8c. Here, the day POI group may be a POI group which binds POIs staying in the same day. For example, the day POI group may be a POI group which binds travel destinations staying in the same day. In addition, the displayed content information may include the number of selected POIs among POIs included in each day.

Figure 8D:
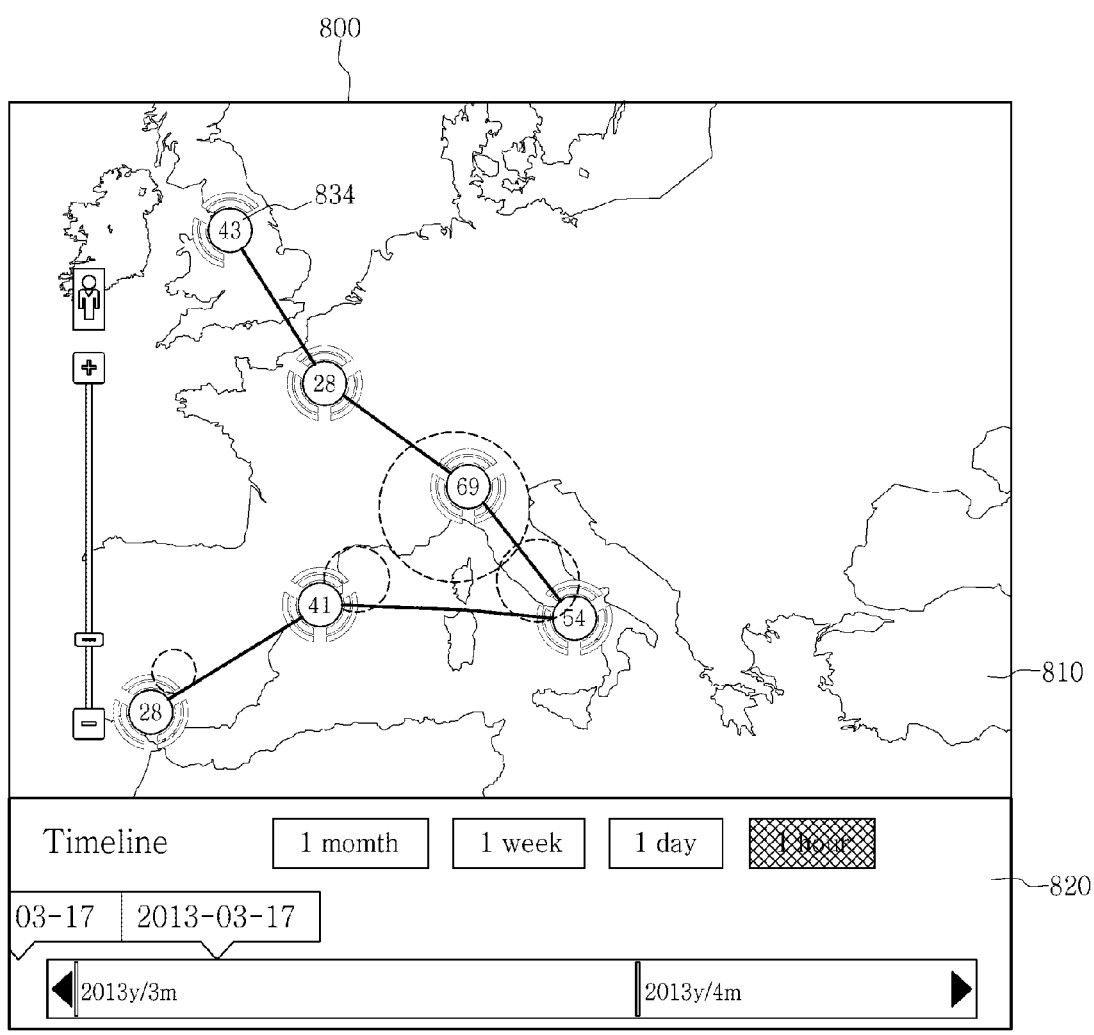

Referring to FIG. 8d, the user may select a hour level, which is a lowest-rank level, as a display level by using the block of the timeline panel 820. In this case, the content management device may display content information 834 about a time POI group corresponding to the week level on the map 810, as in the display screen 800 of FIG. 8d. Here, the time POI group may be a POI group which binds POIs staying at the same time. For example, the time POI group may be a POI group which binds travel destinations staying in the same time.

Table 3 below shows an exemplary LOD model about a Resort-related content.

TABLE 3

| interest target | interest criterion | interest hierarchy |
|---|---|---|
| POI | space | Tree |
|  | Theme park | multiple |
|  | land | multiple |
|  | thrill level | multiple |
|  | age | multiple |
|  | height | multiple |
|  | interest | multiple |
| POI document | description | only one |

Referring to Table 3, the LOD model may include two interest targets such as POI and POI document. POI serving as an interest target may have an interest criterion such as space associated with a location of the POI, age and height associated with a constraint condition of a ride, and a thrill level associated with fun and feature of the ride. Here, the space serving as an interest criterion may be classified into an interest level such as a theme park and a land. In addition, the thrill level serving as an interest criterion may be classified into an interest level such as a water ride, a rotary ride and a fall ride. Similarly, age, height, interest or the like serving as an interest criterion may also be classified into at least one interest level. In addition, Table 3 also describes an interest hierarchy of each interest criterion.

FIG. 9 illustrates a method for the content management device to display content information for POI according to another embodiment of the present disclosure. In an embodiment, the content management device may display content information through the display unit of the user terminal. The display screen 900 of FIG. 9 may display a map 910, a POI panel 920, a POI tree panel 930 and content information 941, 942, 943. Here, the POI panel 920 and the POI tree panel 930 may be generated based on the LOD model of Table 3. The content data of FIG. 9 may be data about Disneyland Resort. In FIG. 9, each ride of Disneyland Resort is assumed as POI, and a web document associate with the ride is assumed as a POI document.

Figure 9A:
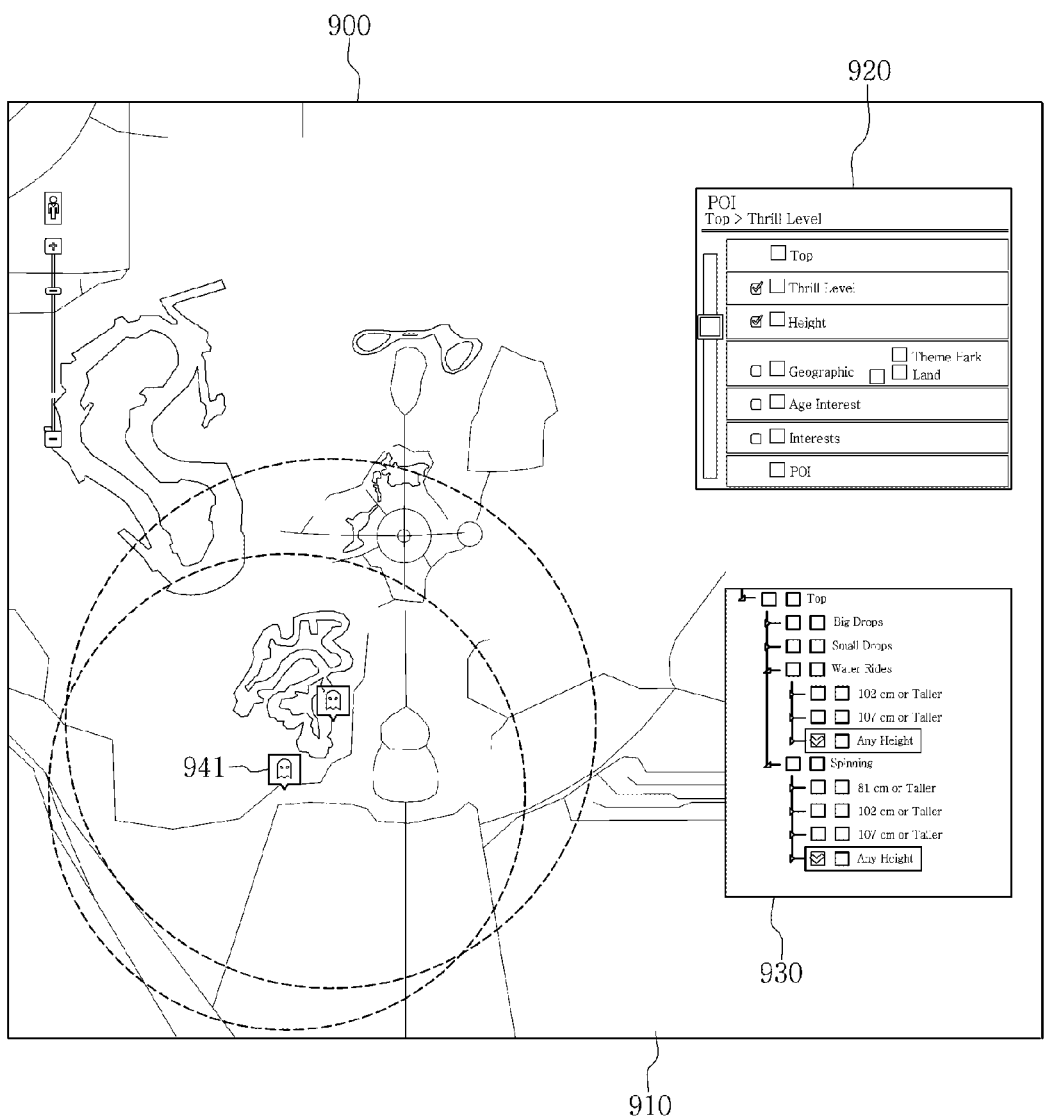
FIGS. 9A-9C illustrate a method for the content management device to display content information for POI according to another embodiment of the present disclosure.

FIG. 9a illustrates a method for the content management device to display content information through the user terminal according to a first embodiment. In more detail, FIG. 9a illustrates a method for displaying content information 941 according to a first scenario in which a family visiting the Disneyland Resort desires to use a ride using "specific height" as a constraint condition among "water ride" and "rotary ride".

In this scenario, the user may select a thrill level and a height as interest criteria by using the check box of the POI panel 920 and may also select so that the thrill level has a higher priority in comparison to the height. In other words, the user may select the thrill level as a higher-rank interest criterion and the height as a lower-rank interest criterion. In addition, the user may select "water ride" and "rotary ride" belonging to the thrill level by using the check box of the POI tree panel 930 and select "specific height" among heights of the constraint condition corresponding to the selected thrill level. In addition, the user may select a display level by using the slider bar of the POI panel 920.

Based on the selection of the user, the content management device may obtain LOD information and process POI into content information suitable for the interest of the user based on the LOD information. In addition, the content management device may display content information suitable for the interest of the user through the user terminal. In addition, as in the display screen of FIG. 9a, the displayed content information may show the number of POIs suitable for the selected condition among the entire POIs. For example, the displayed content information may show that among 13 POIs belonging to the water ride, 10 POIs are suitable for the "specific height" constraint condition and also show that among 17 POIs belonging to the rotary ride, 14 POIs are suitable for the "specific height" constraint condition. By doing so, the user may obtain content information suitable for a desired condition.

Figure 9B:
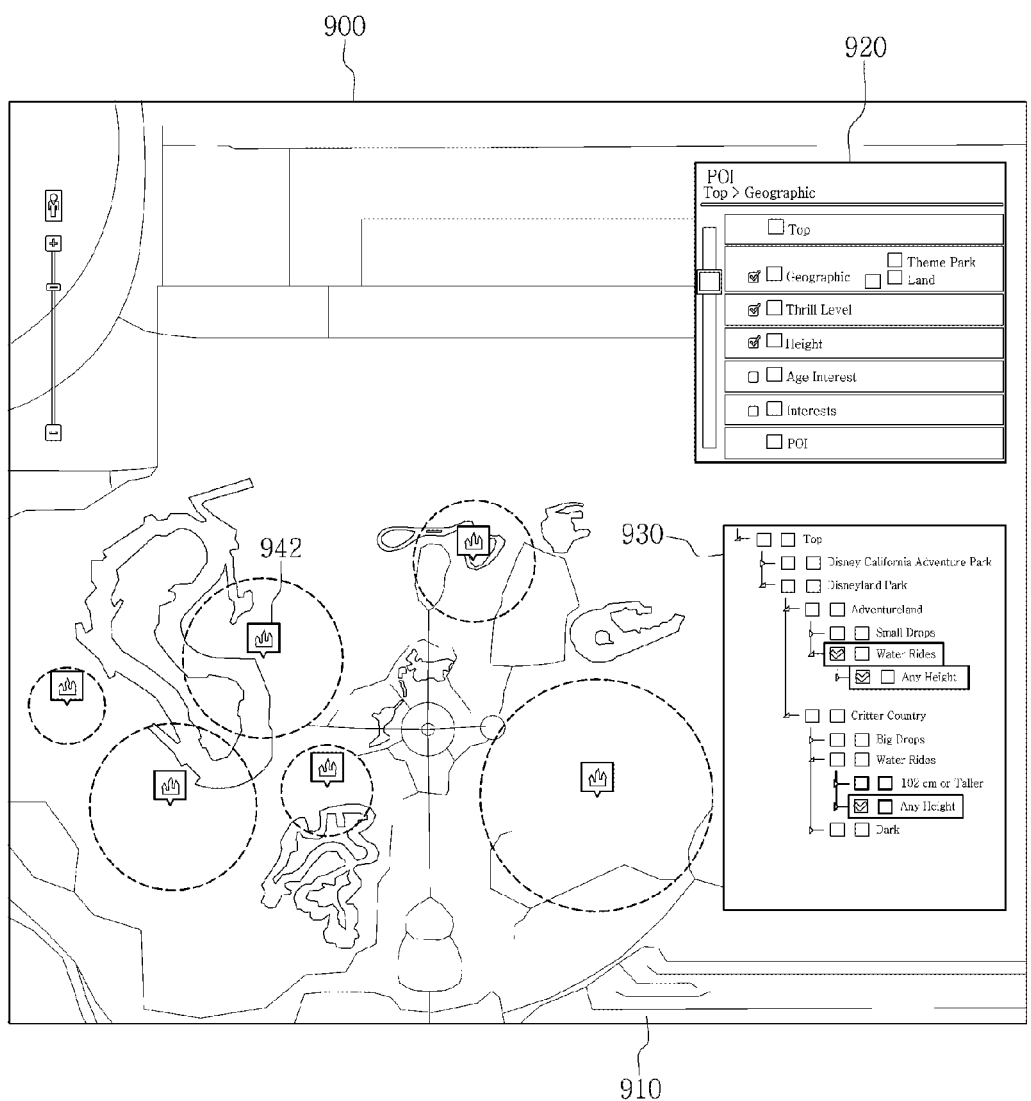

FIG. 9b illustrates a method for the content management device to display content information through the user terminal according to a second embodiment. In more detail, FIG. 9b illustrates a method for displaying content information 942 according to a second scenario in which a family visiting Disneyland Resort wishes to use a ride using "specific height" as a constraint condition among "water ride" and "rotary ride" in Disneyland Park located nearest to a current spot.

In this scenario, the user may select a space, a thrill level and a height as interest criteria by using the check box of the POI panel 920 and may also select so that the space has a higher priority in comparison to the thrill level and the thrill level has a higher priority in comparison to the height. In other words, the user may select the space as a higher-rank interest criterion and the height as a lower-rank interest criterion. In addition, the user may select Disneyland Park belonging to the space serving as a highest-rank interest criterion, select "water ride" and "rotary ride" belonging to the thrill level of the selected space, and select "specific height" among heights of the constraint condition corresponding to the selected thrill level by using the check box of the POI tree panel 930. In addition, the user may select a land level as a display level among the spaces by using a slider bar and a sub-slider bar of the POI panel 920.

Based on the selection of the user, the content management device may obtain LOD information and process POI into content information suitable for the interest of the user based on the LOD information. In addition, the content management device may display content information suitable for the interest of the user through the user terminal. In addition, as shown in the display screen of FIG. 9b, the displayed content information may show the number of POIs suitable for the selected condition among the entire POIs. For example, the displayed content information may show that among 13 POIs belonging to the adventure land, 7 POIs are suitable for the "specific height" constraint condition of "water ride" and "rotary ride". By doing so, the user may obtain content information suitable for a desired condition.

Figure 9C:
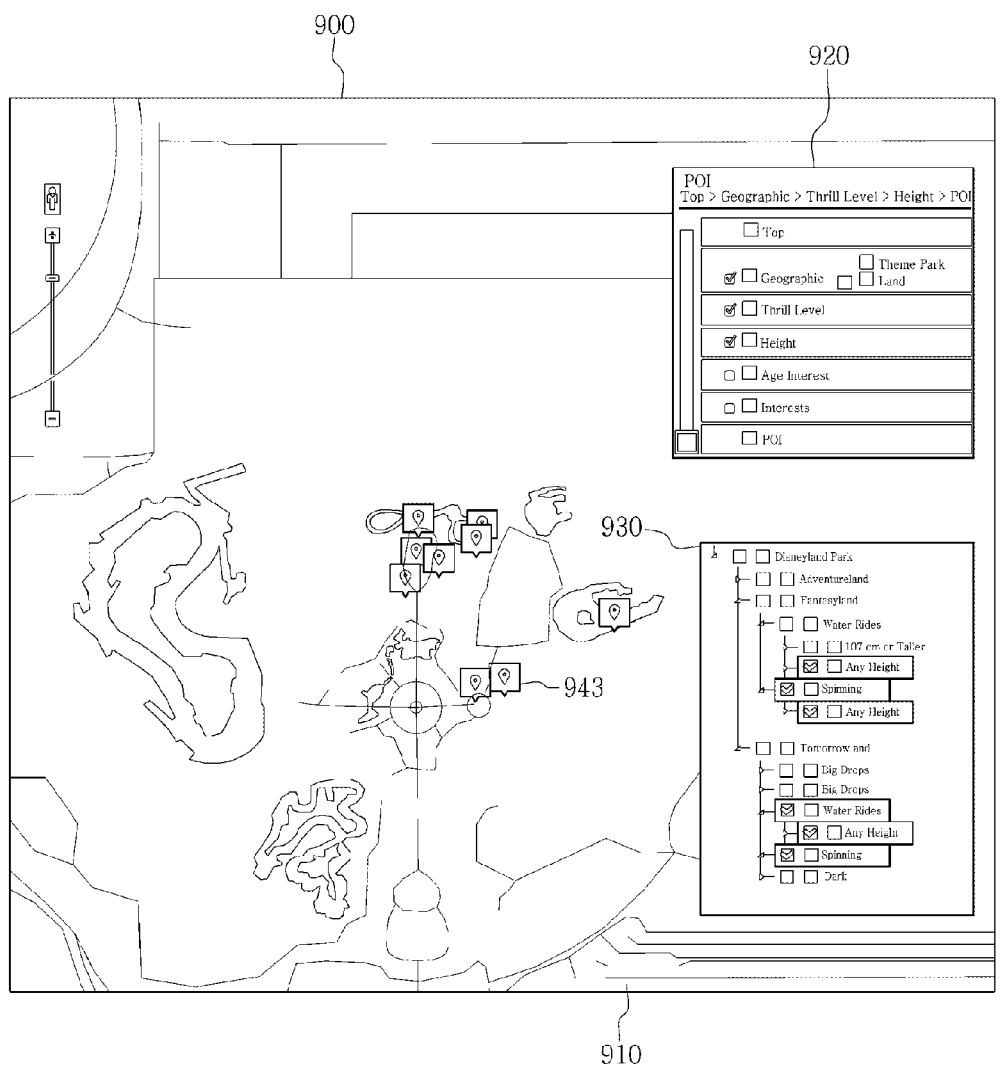

FIG. 9c illustrates a method for the content management device to display content information through the user terminal according to a third embodiment. In more detail, FIG. 9c illustrates a method for displaying content information 943 according to a third scenario in which a family visiting Disneyland Resort wishes to use a ride using "specific height" as a constraint condition among "water ride" and "rotary ride" in two parks of Disneyland Park located nearest to a current spot.

In this scenario, the user may select a space, a thrill level and a height as interest criteria by using the check box of the POI panel 920 and may also select so that the space has a higher priority in comparison to the thrill level and the thrill level has a higher priority in comparison to the height. In other words, the user may select the space as a higher-rank interest criterion and the height as a lower-rank interest criterion. In addition, the user may select "Disneyland Park" among parks belonging to the higher-rank space, selects "Fantasy Land" and "Tomorrow Land" among lands corresponding to a lower-rank space of the selected higher-rank space, select "water ride" and "rotary ride" belonging to the thrill level of the selected land, and select "specific height" among heights of the constraint condition corresponding to the selected thrill level by using the check box of the POI tree panel 930. In addition, the user may select a POI level as a display level by using a slider bar and a sub-slider bar of the POI panel 920.

Based on the selection of the user, the content management device may obtain LOD information and process POI into content information suitable for the interest of the user based on the LOD information. In addition, the content management device may display content information suitable for the interest of the user through the user terminal. In addition, as shown in the display screen of FIG. 9c, the displayed content information may show the number of POIs suitable for the selected condition among the entire POIs. By doing so, the user may obtain content information suitable for a desired condition.

FIG. 10 illustrates a method for the content management device to display content information for a POI document according to an embodiment of the present disclosure. In an embodiment, the content management device may display content information through the display unit of the user terminal. The display screen 1000 of FIG. 10 may display a map 1010, a document panel 1020 and content information 1030. In an embodiment, the user terminal may activate the document panel 1020 when POI or POI group is selected. For example, as shown in FIG. 10, the user terminal may activate the document panel when Buckingham Palace POI is selected.

Here, the document panel 1020 may include a first slider bar 1021 for adjusting a description level of a POI document or a POI group document serving as an interest criterion and a second slider bar 1022 for adjusting a level of a route serving as an interest criterion, without being limited thereto. The user may select a description level of the POI document by adjusting a level of the first slider bar 1021 or select a route level by adjusting a level of the second slider bar 1022. If the description level and the route level are selected, the content management device may obtain LOD information based on the selection of the user and process the POI document into content information suitable for the interest of the user based on the LOD information. Hereinafter, a method for the content management device to display a POI document according to various description levels through the user terminal when the route level is a POI level and Buckingham Palace POI is selected will be described in detail.

Figure 10A:
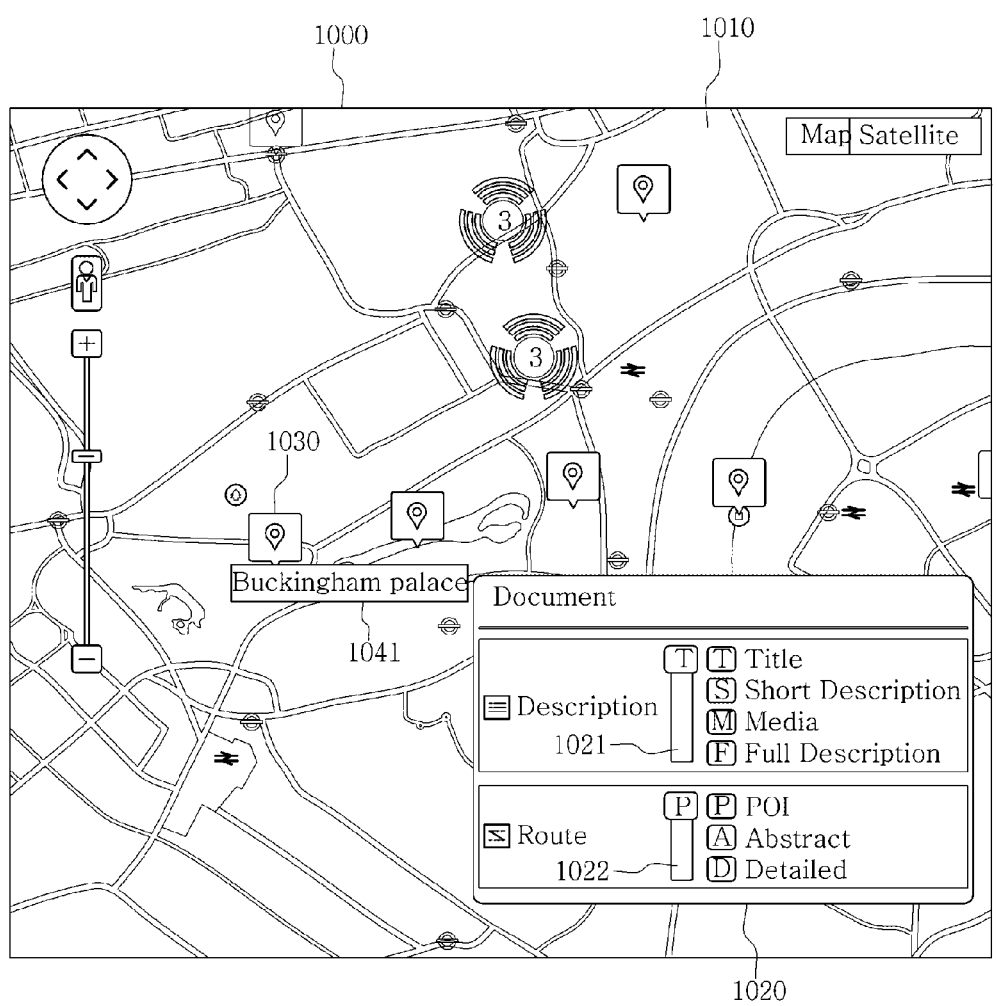
FIGS. 10A-10D illustrate a method for the content management device to display content information for a POI document according to an embodiment of the present disclosure.

Referring to FIG. 10a, the user may select a subject level, which is a highest-rank level, as a description level of the POI document by using the first slider bar 1021 of the document panel 1020. In this case, the content management device may display the subject of the selected POI 1030 as the POI document 1041. For example, as in the display screen of FIG. 10a, if Buckingham Palace POI is selected, the user terminal may display "Buckingham Palace" which is a subject of a POI document associated with the Buckingham Palace POI.

Figure 10B:
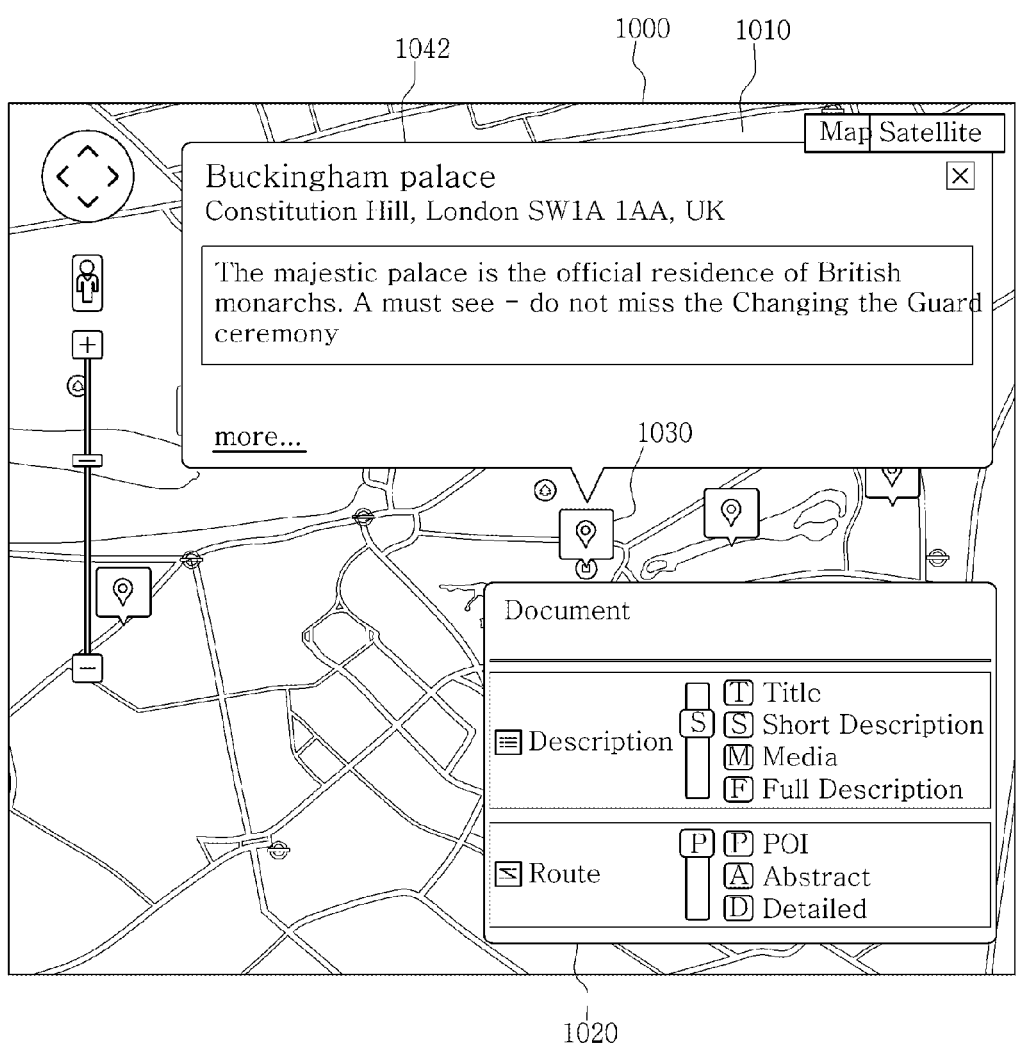

Referring to FIG. 10b, the user may select a short description level, which is a next higher-rank level, as a description level of the POI document by using the first slider bar 1021 of the document panel 1020. In this case, the content management device may display a short description about the selected POI 1030 as the POI document 1042. Here, the short description may be location information and brief explanation about the selected POI. For example, as in the display screen of FIG. 10b, if Buckingham Palace POI is selected, the user terminal may display "location of Buckingham Palace" and "brief explanation of Buckingham Palace", which is a short description about the Buckingham Palace POI.

Figure 10C:
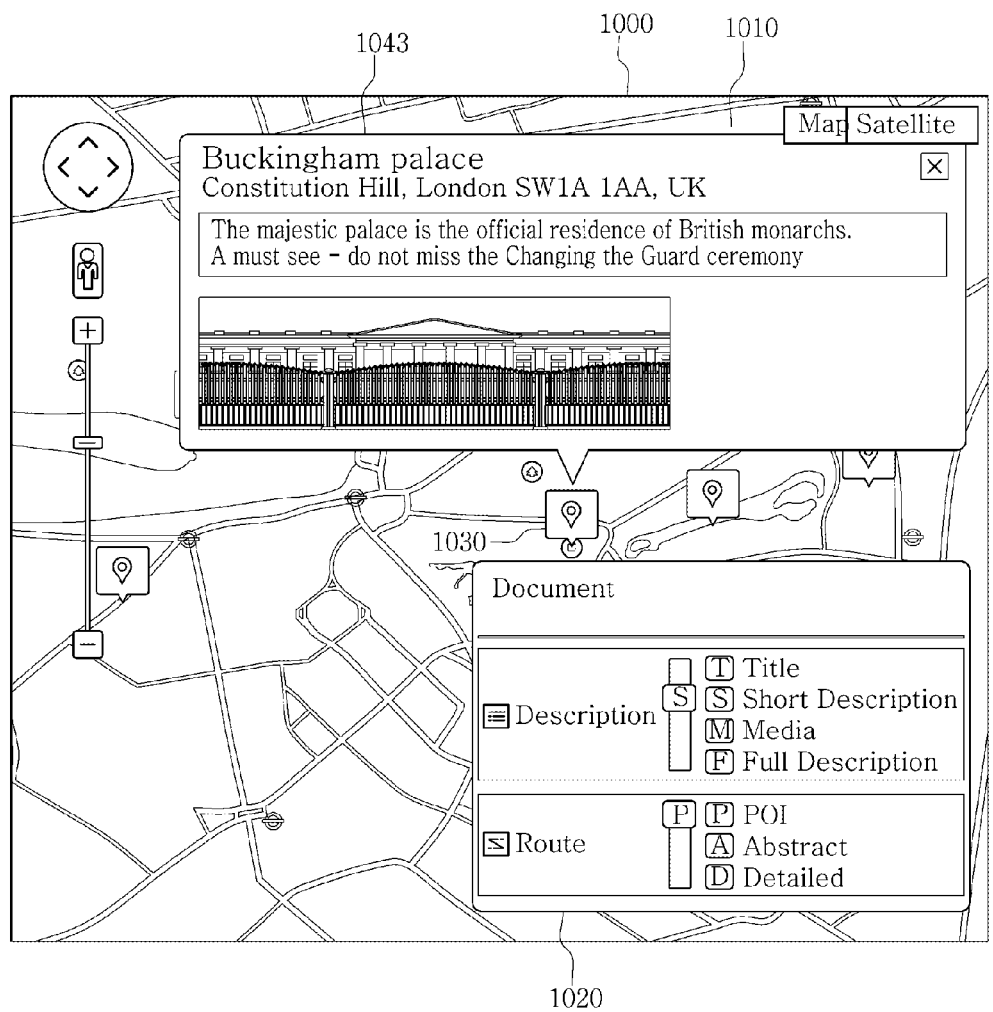

Referring to FIG. 10c, the user may select a media level, which is a next lower-rank level, as a description level of the POI document by using the first slider bar 1021 of the document panel 1020. In this case, the content management device may display media about the selected POI 1030 as the POI document 1043. Here, the media may be a representative image or a moving picture about the selected POI. For example, as in the display screen of FIG. 10c, if Buckingham Palace POI is selected, the user terminal may display a "representative image of Buckingham Palace" which is a media about the Buckingham Palace POI.

Figure 10D:
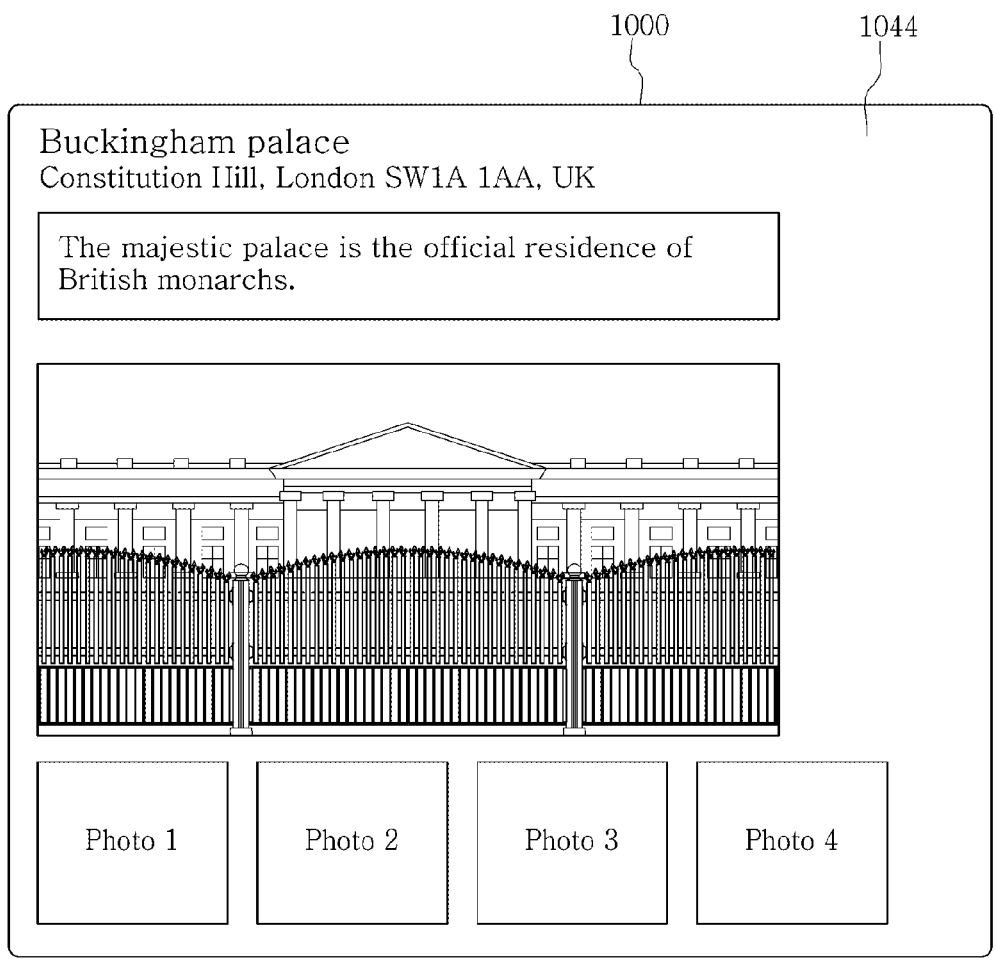

Referring to FIG. 10d, the user may select a full description level, which is a lowest-rank level, as a description level of the POI document by using the first slider bar 1021 of the document panel 1020. In this case, the content management device may display the full description about the selected POI 1030 as the POI document 1044. Here, the full description may be all information about the selected POI. For example, as in the display screen of FIG. 10d, if Buckingham Palace POI is selected, the user terminal may display subject, location information, brief explanation, representative image, all images and a web link of the Buckingham Palace POI. In an embodiment, if the full description level is selected, the user terminal may display information about the POI document on the entire display screen.

As described above, as the description level of a POI document changes from a subject level, which is a highest-rank level, to a full description level, which is a lowest-rank level, the user terminal may display more detailed information about the selected POI. By doing so, the user may observe the same content in various levels suitable for the interest of the user. In addition, even though FIG. 10 just illustrates a case where the route level is a POI level, the same description may also be applied to cases where the route level is a summary level or a detail level. In other words, the same description may also be applied to POI group documents of various levels.

Figure 11:
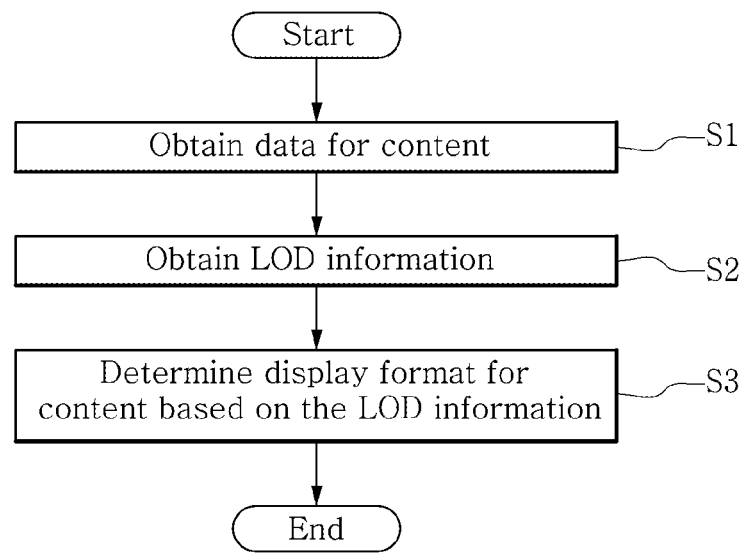
FIG. 11 is a flowchart for illustrating a content processing method according to an embodiment of the present disclosure.

FIG. 11 is a flowchart for illustrating a content processing method according to an embodiment of the present disclosure. In the following flowchart, the same feature as illustrated in FIGS. 1 to 10 will not be described in detail.

Referring to FIG. 11, the content management device may obtain data about content ("content data") (S1). Here, the content data may include information about at least one POI and a POI document associated with each of the at least one POI. In addition, the content data may include information about a map having location information or multimedia content (an image or a moving picture).

Next, the content management device may obtain at least one LOD information for displaying contents according to an interest of the user (S2). Here, the LOD information means information for expressing an interest of the user about the content. In more detail, in general cases, a single content may be classified into a plurality of information units by using information about an interest criterion, an interest hierarchy and an interest level of the above LOD model, and the LOD information may include information for classifying the content into a plurality of information units according to the interest of the user or information for displaying interest information of the classified content, suitable for the interest of the user. In other words, the LOD information may have a concept including content classification information or content display information.

In an embodiment, the content management device may obtain first LOD information which expresses an interest of the user about POI. For example, the first LOD information may include information about an interest criterion and interest level of the user with respect to the POI. In addition, the first LOD information may further include information about an interest hierarchy and interest order of the user with respect to the POI. In another embodiment, the content management device may receive second LOD information which expresses an interest of the user about the POI document. For example, the second LOD information may include information about an interest of the user level with respect to description of the POI document.

Next, the content management device may determine a display format of the interest information about content based on the LOD information (S3). Here, the display format may include information associated with display of the content. For example, the display format may include display attribute information such as content display location, content display color, content display size or the like. In an embodiment, the content management device may determine a display format of the information about the POI based on the first LOD information. In another embodiment, the content management device may determine a display format of the information about the POI document based on the second LOD information.

Figure 12:
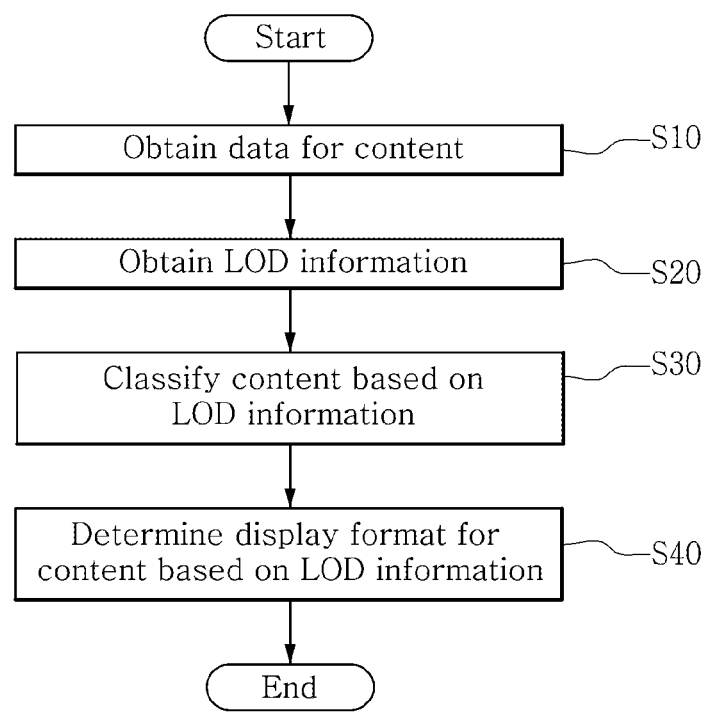
FIG. 12 is a flowchart for illustrating a content processing method according to another embodiment of the present disclosure.

FIG. 12 is a flowchart for illustrating a content processing method according to another embodiment of the present disclosure. In more detail, FIG. 12 is a flowchart for illustrating a method for classifying POI contents according to an interest of the user with respect to the POI contents. In the following flowchart, the same feature as illustrated in FIGS. 1 to 11 will not be described in detail.

Referring to FIG. 12, the content management device may obtain data about content ("content data") (S10). Next, the content management device may obtain at least one LOD information for displaying contents according to an interest of the user (S20). S10 and S20 have been already described above with reference to FIG. 11.

Next, the content management device may classify contents based on the LOD information (S30). In an embodiment, the content processing unit 140 may classify a plurality of POIs into at least one POI group based on the LOD information. In addition, the content processing unit 140 may classify a document associated with the POI into a POI group document associated with the POI group. Here, the classification may have a concept including categorizing, grouping and summarizing. This has been described above in detail with reference to FIG. 3. In addition, the content management device may visualize the POI group based on the display format.

Next, the content management device may determine a display format of the interest information about the content based on the LOD information (S40).

Figure 13:
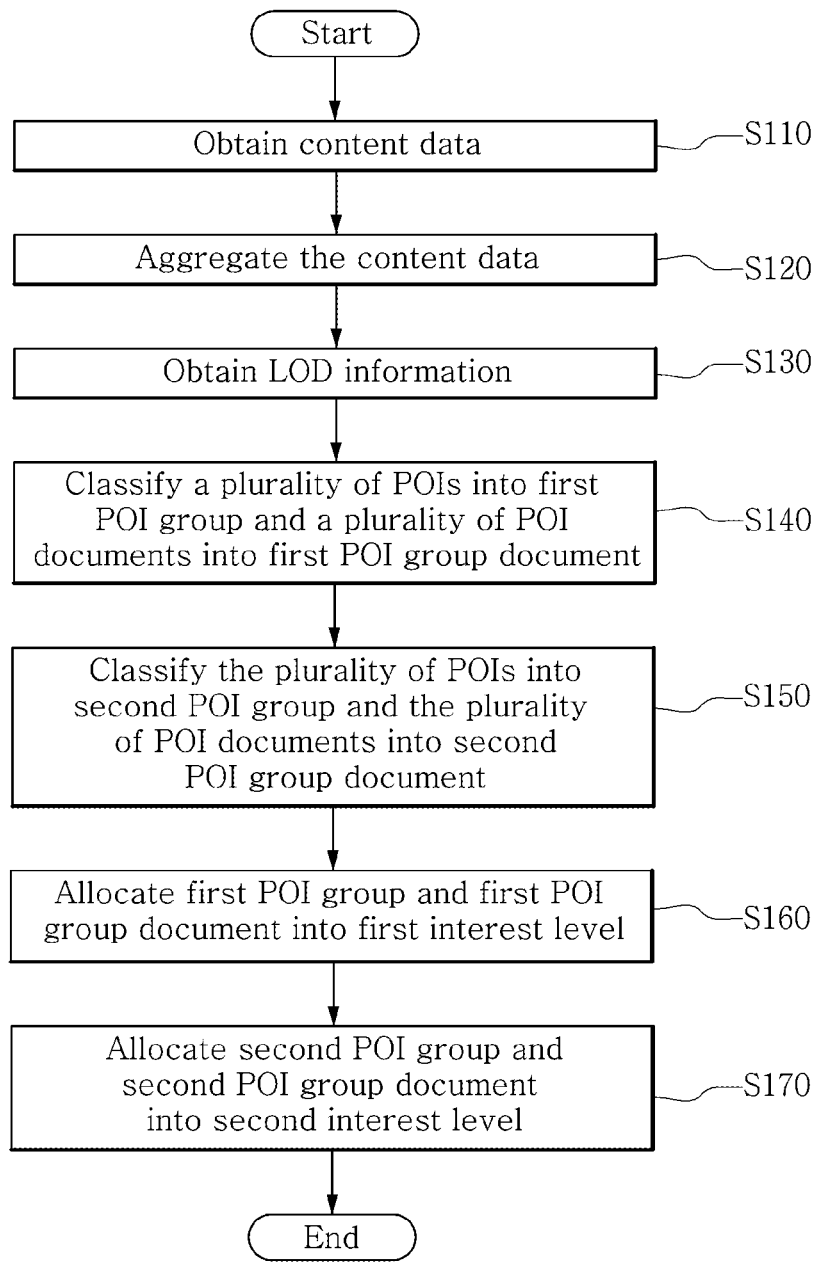
FIG. 13 is a flowchart for illustrating a content processing method according to another embodiment of the present disclosure.

FIG. 13 is a flowchart for illustrating a content processing method according to another embodiment of the present disclosure. In more detail, FIG. 13 is a flowchart for illustrating a method for classifying POI contents according to an interest of the user with respect to the POI contents. In the following flowchart, the same feature as illustrated in FIGS. 1 to 12 will not be described in detail.

Referring to FIG. 13, the content management device may obtain content data (S110). In an embodiment, the content management device may obtain content data from a content server. For example, the POI content server may be an internal or external server including POI information using node.js. In another embodiment, the content management device may obtain POI content from a geo-referenced document on the web, which is tagged to a URL of the POI. In another embodiment, the content management device may obtain POI content from linked data which has the POI included in the content server as geographic information. In addition, the content management device may obtain POI content from data input by the user. This has been described above in detail with reference to FIGS. 2 and 3.

Next, the content management device may aggregate the obtained content data (S120). The content management device may aggregate information included in the obtained POI and POI document. In an embodiment, the content management device may aggregate POI contents by mashing up the POI contents. Here, the POI may include identification information, display information, location information or the like of the POI. This has been described above in detail with reference to FIG. 6.

Next, the content management device may obtain LOD information about the POI content ("LOD information") (S130). Here, the LOD information means information expressing an interest of the user about the content. In more detail, in general cases, a single content may be classified into a plurality of information units by using information about an interest criterion, an interest hierarchy and an interest level of the above LOD model, and the LOD information may include information for classifying the content into a plurality of information units according to the interest of the user or information for displaying interest information of the classified content, suitable for the interest of the user. In other words, the LOD information may have a concept including content classification information or content display information. This has been described above in detail with reference to FIGS. 3 and 4.

Next, the content management device may classify a plurality of POIs into a first POI group based on the obtained LOD information and the aggregated POI content data, and classify a POI document into a POI group document associated with the first POI group (S140). Next, the content management device may classify a plurality of POIs into a second POI group based on the obtained LOD information and the aggregated POI contents, and classify a POI document into a POI group document associated with a second POI group (S150). Here, the POI may include most detailed description. In addition, a POI group in a higher level may include more general or inclusive description. For example, the second POI group may include more general or inclusive description in comparison to the first POI group.

Generally, the content management device may classify a plurality of POIs into a group of at least one level based on the obtained LOD information and the aggregated POI contents, and classify a POI document associated with the plurality of POIs into a group document associated with the group of at least one level. In an embodiment, the content management device may classify POI contents from a most detailed level to a most general level according to the interest criterion and the interest level. At this time, the most general level may be set has a highest-rank interest level. This has been described above in detail with reference to FIGS. 2 and 3.

Next, the content management device may allocate the first POI group content including the first POI group and the first POI group document to a first interest level (S160). Next, the content management device may allocate the second POI group content including the second POI group and the second POI group document to a second interest level (S170). Generally, the content management device may allocate an interest level to each group content including a group of various levels and a group document associated with the group. This has been described above in detail with reference to FIGS. 2 and 3.

Figure 14:
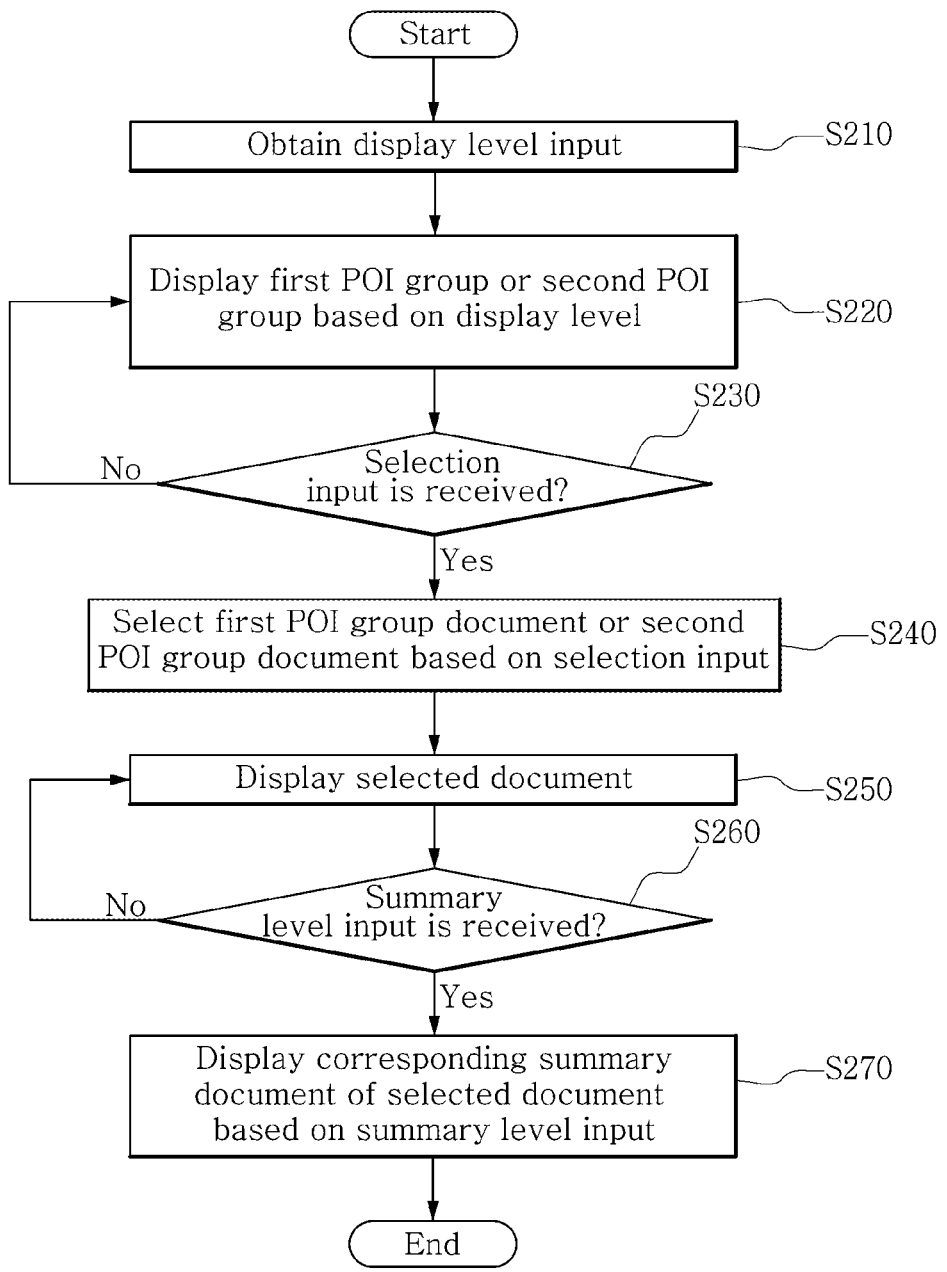
FIG. 14 is a flowchart for illustrating a content processing method according to another embodiment of the present disclosure.

FIG. 14 is a flowchart for illustrating a content processing method according to another embodiment of the present disclosure. FIG. 14 is a flowchart for illustrating a method for displaying POI contents according to an interest of the user with respect to the POI contents. In the following flowchart, the same feature as illustrated in FIGS. 1 to 13 will not be described in detail.

Referring to FIG. 14, the content management device may receive an input of a display level (S210). The content management device may receive an input of a display level through a user interface. The display level may correspond to an interest level. For example, the first display level may correspond to a first interest level, and the second display level may correspond to a second interest level. Here, the display level means a level representing the degree of display of contents. Next, the content management device may display the first POI group or the second POI group based on the input of the display level (S220). For example, if the input of the first display level is received, the content management device may display the first POI group allocated to the first interest level corresponding to the first display level. In another example, if an input of the second display level is received, the content management device may display the second POI group allocated to the second interest level corresponding to the second display level.

In this case, the content management device may generate at least one feature representing at least one POI group. For example, the content management device may generate a first feature representing the first POI group and a second feature representing the second POI group. Here, the first feature may include at least one of a first region, a first marker and a first text. In addition, the second feature may include at least one of a second region, a second marker and a second text. This has been described above in detail with reference to FIG. 3. In addition, the content management device may display POI based on the input of the display level. For example, the content management device may display POI if the input of the POI display level is received.

Next, the content management device may determine whether a selection input for selecting one of the first POI group and the second POI group is received (S230). The content management device may receive a selection input for selecting one of the POI and the POI group. In an embodiment, the content management device may receive a selection input for selecting one of the POI, the first POI group and the second POI group. The content management device may receive a selection input for selecting one of the POI and the POI group displayed through the user interface. Next, if the selection input is received, the content management device may select a single document among the POI document, the first POI group document and the second POI group document based on the selection input (S240). In an embodiment, the content management device may select POI or POI group, and select a POI document associated with the selected POI or a POI group document associated with the selected POI group. In addition, if the selection input is not received, the content management device may continuously display the POI group displayed in S220. Next, the content management device may display the selected document (S250). In an embodiment, the content management device may select the selected document in a preset summary level.

If the POI or the POI group is selected by the user, the content management device may generate a POI document or a POI group document in a preset format. In an embodiment, the content management device may generate a document provided to the user when the POI group is selected by a document handler. For example, the content management device may generate the POI document or the POI group document as a HTML document, without being limited thereto. In addition, the content management device may transmit the generated feature or HTML document to the map processing unit. In addition, the content management device may be configured as a plurality of modules so as to generate a feature and a HTML document adaptive to an application. By doing so, visualization may be performed suitable for a purpose of an individual application.

Next, the content management device may determine whether a summary level input for the selected document is received (S260). In an embodiment, the content management device may receive a summary level input about the document selected by the user through the user interface. In an embodiment, the summary level corresponds to a document summary level. For example, the first summary level may correspond to a first document summary level, and the second summary level may correspond to a second document summary level. Here, the summary level means a level representing a summary degree of the document. Next, if a summary level input is received, the content management device may display the corresponding summary document of the selected document based on the summary level input (S270). For example, if POI is selected based on the selection input and the first summary level is received as an input, the content management device may display a first level summary document of the POI document. In another example, if the first POI group is selected based on the selection input and the first summary level is received as an input, the content management device may display a first level summary document of the first POI group. In addition, if a summary level input is not received, the content management device may continuously display the document, displayed in S250.

The content management method may be implemented as an application or program commands executable by various kinds of computer means and recorded on a computer-readable recording medium. The computer-readable recording medium may include program commands, data files, data structures or the like solely or in combination. The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like. The program commands include not only machine codes made by a complier but also high-level language codes executable by a computer by using an interpreter. The hardware device may be configured to operate as at least one software module to perform the operations of the present disclosure, or vice versa.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof.

In addition, in the present disclosure, both an article invention and a process invention are described together, and both of them may be complementarily applied if necessary.

[Reference Symbols]

| 10: server | 20: input unit |
|---|---|
| 30: display unit | 100: content management device |

What is claimed is:

1. A content management method, comprising:
   obtaining data for a content comprising points-of-interest (POIs) and POI documents associated with each of the POIs;
   obtaining level-of-detail (LOD) information comprising interest levels of the content; and
   determining a display format to display an interest information about the content according to an interest of a user based on the LOD information,
   wherein the LOD information is defined by an interest criterion, an interest hierarchy, and an interest order,
   wherein the interest criterion is a criterion of an interest of the user about a single content,
   wherein the interest levels are degrees of interest of the user about the interest criterion,
   wherein the interest hierarchy is a hierarchical structure representing a hierarchical configuration of the interest levels formed by the interest criterion,
   wherein the interest order is an application order of the interest criterion, and
   wherein the interest levels are independent from a scale level of a map at which the content is displayed.

2. The content management method according to claim 1, wherein obtaining the LOD information comprises receiving first LOD information from a user terminal, the first LOD information including information an interest level among the interest levels related to a POI among the POIs, and
   wherein the determining of the display format comprises determining a display format of the POI based on the first LOD information, in response to the first LOD information being received.

3. The content management method according to claim 1, wherein the obtaining of the LOD information comprises receiving second LOD information from a user terminal, the second LOD information comprising information on an interest level among the interest levels related to a POI among the POIs, and
   wherein determining the display format comprises determining a display format of the POI document based on the second LOD information, in response to the second LOD information being received.

4. The content management method according to claim 1, further comprising:
   classifying the POIs into at least one POI group based on the LOD information before the determining of the display format.

5. The content management method according to claim 4, further comprising:
   classifying a POI document among the POI documents associated with the POI into a POI group document associated with a POI group among the at least one POI group based on the LOD information.

6. The content management method according to claim 5, further comprising:
   visualizing the POI group based on the display format.

7. The content management method according to claim 6, wherein the visualizing of the POI group comprises generating a visual feature corresponding to the POI group.

8. The content management method according to claim 7, wherein the visual feature is any one or any combination of any two or more of a region surrounding POIs included in the POI group, a marker representing the POI group, and a text representing the POI group.

9. The content management method according to claim 1, further comprising:
   separating the POI and the POI document from the content before obtaining the data for the content.

10. The content management method according to claim 1,
    wherein the POI is recognized by a uniform resource locator (URL) of the POI document associated with the POI.

11. The content management method of claim 1, wherein the interest levels comprise a hierarchy of time ranges.

12. The content management method of claim 1, wherein the selected interest level is selected by receiving input to check a displayed box, and a display level of the content is selected by receiving input to adjust a level of a displayed sidebar.

13. A non-transitory computer-readable storage medium storing instructions that, when executed by a processor, cause the processor to perform a method of content management, the method comprising:
obtaining data for a content comprising points-of-interest (POIs) and POI documents associated with each of the POIs;
obtaining level-of-detail (LOD) information comprising interest levels of the content; and
determining a display format to display an interest information about the content according to an interest of the user based on the LOD information,
wherein the LOD information is defined by an interest criterion, an interest hierarchy, and an interest order,
wherein the interest criterion is a criterion of an interest of the user about a single content,
wherein the interest levels are degrees of interest of the user about the interest criterion,
wherein the interest hierarchy is a hierarchical structure representing a hierarchical configuration of the interest levels formed by the interest criterion,
wherein the interest order is an application order of the interest criterion, and
wherein the interest levels are independent from a scale level of a map at which the content is displayed.

14. A content management device, comprising:
a content management unit configured to obtain data for a content comprising points-of-interest (POIs) and POI documents associated with each of the POIs;
a LOD information management unit configured to obtain level-of-detail (LOD) information comprising an interest level of the content; and
a display format determination unit configured to determine a display format to display an interest information about the content according to an interest of the user based on the LOD information,
wherein the LOD information is defined by an interest criterion, an interest hierarchy, and an interest order,
wherein the interest criterion is a criterion of an interest of the user about a single content,
wherein the interest levels are degrees of interest of the user about the interest criterion,
wherein the interest hierarchy is a hierarchical structure representing a hierarchical configuration of the interest levels formed by the interest criterion,
wherein the interest order is an application order of the interest criterion, and
the interest levels are independent from a scale level of a map at which the content is displayed.

15. The content management device according to claim 14,
wherein the LOD information management unit is further configured to receive first LOD information from a user terminal, the first LOD information comprising information on an interest level among the interest levels related to a POI among the POIs, and
wherein the display format determination unit is further configured to determine a display format of the POI based on the first LOD information, in response to the first LOD information being received.

16. The content management device according to claim 15,
wherein the LOD information management unit is further configured to receive second LOD information from a user terminal, the second LOD information comprising information on an interest level among the interest levels related to the POI document, and
wherein the display format determination unit is further configured to determine a display format of a POI document based on the second LOD information, in response to the second LOD information being received.

17. The content management device according to claim 14, further comprising:
a content processing unit configured to classify the POIs into at least one POI group based on the LOD information.

18. The content management device according to claim 17,
wherein the content processing unit is further configured to classify a POI document among the POI documents associated with the POI into a POI group document associated with a POI group among the at least one POI group based on the LOD information.

19. The content management device according to claim 17,
wherein the content processing unit is further configured to visualize the POI group based on the display format.

20. The content management device according to claim 14, further comprising:
a content converter configured to separate the POI and the POI document from the content.

* * * * *